US007993191B2

(12) United States Patent
Evans et al.

(10) Patent No.: US 7,993,191 B2
(45) Date of Patent: Aug. 9, 2011

(54) GAMING SYSTEM, GAMING DEVICE AND METHOD FOR PROVIDING DRAW POKER GAME

(75) Inventors: Anthony M. Evans, Ruislip (GB); Mark C. Nicely, Daly City, CA (US); John F. Daley, Las Vegas, NV (US); Bryan D. Wolf, Reno, NV (US); Scott A. Caputo, Santa Clara, CA (US)

(73) Assignee: IGT, Reno, NV (US)

( * ) Notice: Subject to any disclaimer, the term of this patent is extended or adjusted under 35 U.S.C. 154(b) by 202 days.

(21) Appl. No.: 12/045,431

(22) Filed: Mar. 10, 2008

(65) Prior Publication Data

US 2009/0224478 A1 Sep. 10, 2009

(51) Int. Cl.
*A63F 1/00* (2006.01)
*A63F 13/00* (2006.01)

(52) U.S. Cl. ........................ 463/13; 273/292; 273/138.2

(58) Field of Classification Search .................. 273/292, 273/274, 309, 138.1, 138.2; 463/13, 12
See application file for complete search history.

(56) References Cited

U.S. PATENT DOCUMENTS 1,527,929 A 2/1925 Simons
3,533,629 A 10/1970 Raven
3,876,208 A 4/1975 Wachtler
3,998,462 A 12/1976 Goott
4,560,161 A 12/1985 Hamano
4,582,324 A 4/1986 Koza et al.
4,648,604 A 3/1987 Horan
4,695,053 A 9/1987 Vazquez, Jr. et al.
4,743,022 A 5/1988 Wood
4,861,041 A 8/1989 Jones et al.
4,926,327 A 5/1990 Sidley (Continued)

FOREIGN PATENT DOCUMENTS

EP 0688002 12/1995

(Continued)

OTHER PUBLICATIONS

American Thunder Advertisement, written by IGT, published in 1998.

(Continued)

*Primary Examiner* — Benjamin H Layno
(74) *Attorney, Agent, or Firm* — K&L Gates LLP

(57) ABSTRACT

A gaming system having a five card draw poker game is provided. The gaming system causes an initial five card hand to be dealt to the player and also causes a first draw card to be revealed to the player. The player has the option to keep or discard the first draw card. After the player has decided whether or not to keep the first draw card, the gaming system enables the player to replace cards in the initial player hand. If the player selected to discard the first draw card, this card will not be used as a replacement or draw card to form the final player hand. In certain implementations, the player first selects cards to replace in the initial player hand. In these implementations, if the player elects to keep the first draw card, the gaming system will cause the display of a second card and the player has the option of keeping or discarding the second draw card. This process continues until all of the discarded cards in the initial player hand have been replaced or until the player elects to discard one of the draw cards.

25 Claims, 25 Drawing Sheets

U.S. PATENT DOCUMENTS 4,948,128 A 8/1990 Emery, II et al.
4,948,134 A 8/1990 Suttle et al.
5,010,995 A 4/1991 Okada
5,014,988 A 5/1991 Mirando et al.
5,019,973 A 5/1991 Wilcox et al.
5,022,653 A 6/1991 Suttle et al.
5,033,744 A 7/1991 Bridgeman et al.
5,042,818 A 8/1991 Weingardt
5,092,598 A 3/1992 Kamille
5,098,107 A 3/1992 Boylan et al.
5,100,137 A 3/1992 Fulton
5,118,109 A 6/1992 Gumina
5,118,114 A 6/1992 Tucci
5,154,429 A 10/1992 LeVasseur
5,158,293 A 10/1992 Mullins
5,167,413 A 12/1992 Fulton
5,188,363 A 2/1993 Marnell, II et al.
5,205,555 A 4/1993 Hamano
5,248,142 A 9/1993 Breeding
5,251,897 A 10/1993 Fulton
5,255,915 A 10/1993 Miller
5,257,789 A 11/1993 LeVasseur
5,265,874 A 11/1993 Dickinson et al.
5,275,400 A 1/1994 Weingardt et al.
5,280,915 A 1/1994 Groussman
5,286,023 A 2/1994 Wood
5,288,081 A 2/1994 Breeding
5,288,082 A 2/1994 Marquez
5,294,120 A 3/1994 Schultz
5,308,065 A 5/1994 Bridgeman et al.
5,322,295 A 6/1994 Cabot et al.
5,324,041 A 6/1994 Boylan et al.
5,332,228 A 7/1994 Schultz
5,342,047 A 8/1994 Heidel et al.
5,356,140 A 10/1994 Dabrowski et al.
5,382,025 A 1/1995 Sklansky et al.
5,393,057 A 2/1995 Marnell, II
5,411,257 A 5/1995 Fulton
5,413,353 A 5/1995 Demarest et al.
5,415,404 A 5/1995 Joshi et al.
5,417,430 A 5/1995 Breeding
5,431,408 A 7/1995 Adams
5,437,451 A 8/1995 Fulton
5,449,173 A 9/1995 Thomas et al.
5,451,054 A 9/1995 Orenstein
5,486,005 A 1/1996 Neal
5,489,101 A 2/1996 Moody
5,511,781 A 4/1996 Wood et al.
5,531,440 A 7/1996 Dabrowski et al.
5,531,441 A 7/1996 Dabrowski et al.
5,531,448 A 7/1996 Moody
5,536,016 A 7/1996 Thompson
5,542,669 A 8/1996 Charron et al.
5,544,892 A 8/1996 Breeding
5,570,885 A 11/1996 Ornstein
5,573,249 A 11/1996 Johnson
5,586,766 A 12/1996 Forte et al.
5,636,842 A 6/1997 Cabot et al.
5,639,088 A 6/1997 Schneider et al.
5,653,444 A 8/1997 Dahl
5,678,821 A 10/1997 Hedman
5,697,614 A 12/1997 Potter et al.
5,704,835 A 1/1998 Dietz, II
5,711,525 A 1/1998 Breeding
5,718,431 A 2/1998 Ornstein
5,725,216 A 3/1998 Jones
5,732,950 A 3/1998 Moody
5,752,702 A 5/1998 McDaniel
5,755,621 A 5/1998 Marks et al.
5,769,422 A 6/1998 Stromer
5,769,716 A 6/1998 Saffari et al.
5,772,506 A 6/1998 Marks et al.
5,775,692 A 7/1998 Watts et al.
5,779,545 A 7/1998 Berg et al.
5,788,241 A 8/1998 Ung
5,788,574 A 8/1998 Ornstein et al.
5,794,934 A 8/1998 Malcolm
5,799,946 A 9/1998 Groussman
5,816,915 A 10/1998 Kadlic
5,816,916 A 10/1998 Moody
5,820,460 A 10/1998 Fulton
5,823,873 A 10/1998 Moody
5,823,874 A 10/1998 Adams
5,833,536 A 11/1998 Davids et al.
5,839,730 A 11/1998 Pike
5,839,732 A 11/1998 Guidi
5,845,906 A 12/1998 Wirth
5,845,907 A 12/1998 Wells
5,848,932 A 12/1998 Adams
5,851,148 A 12/1998 Brune et al.
5,853,325 A 12/1998 Kadlie
5,855,514 A 1/1999 Kamille
5,868,618 A 2/1999 Netley et al.
5,868,619 A 2/1999 Wood et al.
5,873,781 A 2/1999 Keane
5,882,259 A 3/1999 Holmes, Jr. et al.
5,882,260 A 3/1999 Marks et al.
5,882,261 A 3/1999 Adams
5,897,436 A 4/1999 Singer et al.
5,902,983 A 5/1999 Crevelt et al.
5,908,353 A 6/1999 Andrews
5,911,418 A 6/1999 Adams
5,911,419 A 6/1999 Delaney et al.
5,921,550 A 7/1999 Awada
5,931,467 A 8/1999 Kamille
5,934,998 A 8/1999 Forte et al.
5,944,314 A 8/1999 Stavinsky
5,947,820 A 9/1999 Morro et al.
5,947,821 A 9/1999 Stone
5,947,822 A 9/1999 Weiss
5,951,012 A 9/1999 Feola
5,951,397 A 9/1999 Dickinson
5,954,335 A 9/1999 Moody
5,964,464 A 10/1999 Jones
5,967,894 A 10/1999 Kinoshita et al.
5,971,849 A 10/1999 Falciglia
5,975,529 A 11/1999 de Keller
5,976,016 A 11/1999 Moody et al.
5,980,384 A 11/1999 Barrie
5,984,309 A 11/1999 Santin
5,984,781 A 11/1999 Sunaga
5,988,643 A 11/1999 Awada
5,990,865 A 11/1999 Gard
5,996,997 A 12/1999 Kamille
5,997,002 A 12/1999 Goldman
6,002,808 A 12/1999 Freeman
6,007,066 A 12/1999 Moody
6,007,424 A 12/1999 Evers et al.
6,012,719 A 1/2000 Webb
6,012,720 A 1/2000 Webb
6,015,346 A 1/2000 Bennett
6,019,374 A 2/2000 Breeding
6,033,307 A 3/2000 Vancura
6,039,648 A 3/2000 Guinn et al.
6,045,129 A 4/2000 Cooper et al.
6,048,267 A 4/2000 Wichinsky
6,050,568 A 4/2000 Hachquet
6,056,641 A 5/2000 Webb
6,056,642 A 5/2000 Bennett
6,059,289 A 5/2000 Vancura
6,059,658 A 5/2000 Mangano et al.
6,062,980 A 5/2000 Luciano
6,068,552 A 5/2000 Walker et al.
6,079,711 A 6/2000 Wei et al.
6,089,976 A 7/2000 Schneider et al.
6,089,977 A 7/2000 Bennett
6,093,100 A 7/2000 Singer et al.
6,098,985 A 8/2000 Moody
6,102,798 A 8/2000 Bennett
6,110,040 A * 8/2000 Sanduski et al. ................ 463/13
6,120,031 A 9/2000 Adams
6,120,378 A 9/2000 Moody et al.
6,126,542 A 10/2000 Fier
6,129,357 A 10/2000 Wichinsky
6,129,632 A 10/2000 Luciano
6,131,907 A 10/2000 Nucifora et al.
6,131,908 A 10/2000 Palmer

| | | | | |
|---|---|---|---|---|
| 6,132,311 | A | 10/2000 | Williams | |
| 6,135,453 | A | 10/2000 | Srichayaporn | |
| 6,135,882 | A | 10/2000 | Kadlic | |
| 6,135,883 | A | 10/2000 | Hachquet | |
| 6,142,874 | A | 11/2000 | Kodachi et al. | |
| 6,146,271 | A | 11/2000 | Kadlic | |
| 6,149,157 | A | 11/2000 | Saun | |
| 6,149,521 | A | 11/2000 | Sanduski | |
| 6,155,568 | A | 12/2000 | Franklin | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,164,652 | A | 12/2000 | Lauretta et al. | |
| 6,173,955 | B1 | 1/2001 | Perrie et al. | |
| 6,174,235 | B1 | 1/2001 | Walker et al. | |
| 6,176,781 | B1 | 1/2001 | Walker et al. | |
| 6,179,293 | B1 | 1/2001 | Hedman | |
| 6,186,894 | B1 | 2/2001 | Mayeroff | |
| 6,190,255 | B1 | 2/2001 | Thomas et al. | |
| 6,203,428 | B1 | 3/2001 | Giobbi et al. | |
| 6,203,429 | B1 | 3/2001 | Demar et al. | |
| 6,206,374 | B1 | 3/2001 | Jones | |
| 6,206,780 | B1 | 3/2001 | Awada | |
| 6,220,959 | B1 | 4/2001 | Holmes, Jr. et al. | |
| 6,220,960 | B1 | 4/2001 | Kryzhanovsky | |
| 6,224,055 | B1 | 5/2001 | Walker et al. | |
| 6,224,483 | B1 | 5/2001 | Mayeroff | |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,234,897 | B1 | 5/2001 | Frohm et al. | |
| 6,237,913 | B1 | 5/2001 | Kamille | |
| 6,237,916 | B1 | 5/2001 | Webb | |
| 6,248,016 | B1 | 6/2001 | Walker et al. | |
| 6,250,685 | B1 | 6/2001 | Walker et al. | |
| 6,257,979 | B1 | 7/2001 | Walker et al. | |
| 6,261,177 | B1 | 7/2001 | Bennett | |
| 6,270,078 | B1 | 8/2001 | Leone et al. | |
| 6,270,079 | B1 | 8/2001 | Chamberlain | |
| 6,270,405 | B1 | 8/2001 | Ferguson | |
| 6,283,855 | B1 | 9/2001 | Bingham | |
| 6,290,600 | B1 | 9/2001 | Glasson | |
| RE37,414 | E | 10/2001 | Harlick | |
| 6,299,170 | B1 | 10/2001 | Yoseloff | |
| 6,299,532 | B1 | 10/2001 | Smith | |
| 6,302,790 | B1 | 10/2001 | Bossard | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,319,124 | B1 | 11/2001 | Baerlocher et al. | |
| 6,322,309 | B1 | 11/2001 | Thomas et al. | |
| 6,322,445 | B1 | 11/2001 | Miller | |
| 6,332,614 | B1 | 12/2001 | Hesse | |
| 6,332,839 | B2 | 12/2001 | Walker et al. | |
| 6,334,613 | B1 | 1/2002 | Yoseloff | |
| 6,334,614 | B1 | 1/2002 | Breeding | |
| 6,336,859 | B2 | 1/2002 | Jones et al. | |
| 6,342,007 | B1 | 1/2002 | Wood et al. | |
| 6,345,823 | B1 | 2/2002 | Webb | |
| 6,346,043 | B1 | 2/2002 | Colin et al. | |
| 6,347,996 | B1 | 2/2002 | Gilmore et al. | |
| 6,358,144 | B1 | 3/2002 | Kadlic et al. | |
| 6,358,146 | B1 | 3/2002 | Adams | |
| 6,358,147 | B1 | 3/2002 | Jaffe et al. | |
| 6,364,766 | B1 | 4/2002 | Anderson et al. | |
| 6,364,767 | B1 | 4/2002 | Brossard et al. | |
| 6,368,214 | B1 | 4/2002 | Luciano | |
| 6,371,851 | B1 | 4/2002 | Singer et al. | |
| 6,402,150 | B1 | 6/2002 | Jones | |
| 6,405,174 | B1 | 6/2002 | Walker et al. | |
| 6,406,023 | B1 | 6/2002 | Rowe | |
| 6,409,173 | B1 | 6/2002 | Tri | |
| 6,409,174 | B1 | 6/2002 | Demarest | |
| 6,413,161 | B1 | 7/2002 | Baerlocher et al. | |
| 6,416,407 | B1 | 7/2002 | Carrico et al. | |
| 6,428,002 | B1 | 8/2002 | Baranauskas | |
| 6,435,506 | B1 | 8/2002 | Piccoli | |
| 6,439,993 | B1 | 8/2002 | O'Halloran | |
| 6,439,995 | B1 | 8/2002 | Hughs-Baird et al. | |
| 6,443,456 | B1 | 9/2002 | Gajor | |
| 6,443,837 | B1 | 9/2002 | Jaffe et al. | |
| 6,457,714 | B1 | 10/2002 | Feola | |
| 6,461,240 | B1 | 10/2002 | Perkins | |
| 6,464,582 | B1 | 10/2002 | Baerlocher et al. | |
| 6,478,675 | B1 | 11/2002 | Awada | |
| 6,514,141 | B1 | 2/2003 | Kaminkow et al. | |
| 6,533,279 | B2 | 3/2003 | Moody et al. | |
| 6,533,658 | B1 | 3/2003 | Walker et al. | |
| 6,547,242 | B1 | 4/2003 | Sugiyama et al. | |
| 6,569,013 | B1 | 5/2003 | Taylor | |
| 6,572,471 | B1 | 6/2003 | Bennett | |
| 6,575,830 | B2 | 6/2003 | Baerlocher et al. | |
| 6,595,852 | B2 | 7/2003 | Wang | |
| 6,599,185 | B1 | 7/2003 | Kaminkow et al. | |
| 6,604,741 | B1 | 8/2003 | Snow | |
| 6,607,437 | B2 | 8/2003 | Casey et al. | |
| 6,609,974 | B2 | 8/2003 | Mead et al. | |
| 6,641,477 | B1 | 11/2003 | Dietz, II | |
| 6,672,959 | B2 | 1/2004 | Moody et al. | |
| 6,695,695 | B2 | 2/2004 | Angel | |
| 6,705,943 | B2 | 3/2004 | Awada | |
| 6,708,975 | B1 | 3/2004 | Fox et al. | |
| 6,726,565 | B2 | 4/2004 | Hughs-Baird | |
| 6,729,621 | B2 | 5/2004 | Moody | |
| 6,923,446 | B2 | 8/2005 | Snow | |
| 6,966,836 | B1 | 11/2005 | Rush et al. | |
| 7,000,921 | B2 | 2/2006 | Schultz | |
| 7,004,834 | B2 | 2/2006 | Walker et al. | |
| 7,029,395 | B1 | 4/2006 | Baerlocher | |
| 7,037,191 | B2 | 5/2006 | Rodgers et al. | |
| 7,056,206 | B2 * | 6/2006 | Aoki et al. | 463/13 |
| 7,094,152 | B2 | 8/2006 | Rush et al. | |
| 7,222,856 | B2 | 5/2007 | Dodge | |
| 7,329,179 | B2 | 2/2008 | Baerlocher | |
| 7,351,146 | B2 | 4/2008 | Kaminkow | |
| 7,354,344 | B2 | 4/2008 | Paulsen et al. | |
| 7,374,486 | B2 | 5/2008 | Baerlocher | |
| 7,393,278 | B2 | 7/2008 | Gerson et al. | |
| 2001/0040341 | A1 | 11/2001 | Kamille | |
| 2002/0082069 | A1 | 6/2002 | Parker | |
| 2002/0086725 | A1 | 7/2002 | Fasbender et al. | |
| 2003/0036418 | A1 | 2/2003 | Seelig et al. | |
| 2003/0040351 | A1 | 2/2003 | Colin et al. | |
| 2003/0064793 | A1 | 4/2003 | Baerlocher et al. | |
| 2003/0073476 | A1 | 4/2003 | Friedman | |
| 2003/0078096 | A1 | 4/2003 | Kaminkow et al. | |
| 2003/0100357 | A1 | 5/2003 | Walker et al. | |
| 2003/0119583 | A1 | 6/2003 | Kaminkow et al. | |
| 2003/0130024 | A1 | 7/2003 | Darby | |
| 2003/0144053 | A1 | 7/2003 | Michaelson | |
| 2003/0162578 | A1 | 8/2003 | Baerlocher et al. | |
| 2004/0033830 | A1 | 2/2004 | Gold et al. | |
| 2004/0043807 | A1 | 3/2004 | Pennington | |
| 2004/0063492 | A1 | 4/2004 | Baerlocher et al. | |
| 2004/0130023 | A1 | 7/2004 | Naiki | |
| 2004/0204218 | A1 | 10/2004 | Hughs-Baird | |
| 2005/0054429 | A1 | 3/2005 | Baerlocher et al. | |
| 2005/0059451 | A1 | 3/2005 | Shackleford | |
| 2005/0060050 | A1 | 3/2005 | Baerlocher | |
| 2005/0113161 | A1 | 5/2005 | Walker et al. | |
| 2005/0282625 | A1 | 12/2005 | Nicely | |
| 2006/0025193 | A1 * | 2/2006 | Gail et al. | 463/16 |
| 2006/0128457 | A1 | 6/2006 | Cannon | |
| 2007/0035091 | A1 | 2/2007 | Tang | |
| 2007/0054726 | A1 | 3/2007 | Muir et al. | |
| 2008/0102934 | A1 | 5/2008 | Tan | |
| 2008/0108406 | A1 | 5/2008 | Oberberger | |
| 2008/0108425 | A1 | 5/2008 | Oberberger | |
| 2008/0113759 | A1 | 5/2008 | Baerlocher | |
| 2008/0132320 | A1 | 6/2008 | Rodgers | |
| 2008/0182650 | A1 | 7/2008 | Randall et al. | |
| 2008/0182655 | A1 | 7/2008 | DeWaal et al. | |

FOREIGN PATENT DOCUMENTS

| | | |
|---|---|---|
| EP | 0874337 | 10/1998 |
| EP | 0945837 | 9/1999 |
| EP | 0984409 | 3/2000 |

| | | |
|---|---|---|
| EP | 1 482 460 | 12/2004 |
| GB | 2 106 292 | 4/1983 |
| GB | 2 144 644 | 8/1983 |
| GB | 2 335 524 | 9/1999 |
| GB | 2 390 822 | 1/2004 |
| JP | 10-328351 | 12/1998 |

OTHER PUBLICATIONS

Anything's Wild Poker Advertisement, written by IGT, published in 2003.
Babooshka Advertisement in Gaming for Africa, written by Atronic, published in May 2002.
Babooshka Article in Strictly Slots, written by Atronic, published in Aug. 2002.
Caribbean Gold II Brochure written by Aristocrat Leisure Industries, published in 1998.
Classified index of card games—note particularly Card exchange games (website), <httpwww.pagat.comclassindex.html>, written by Commerce Group, published before May 31, 2003.
Classified Index of Card Games, Card Exchange Games, printed from http:www.pagat.comclassindex.html on Apr. 27, 2006.
Cops and Donuts Advertisement, written by IGT, published in Jan. 2003.
Description of Texas Hold'em Poker Game available at http:boardgames.about.comcspokeratexas_rules.htm, game of Texas Hold'em Poker known to the public before at least May 31, 2003.
Flex Play Poker Advertisement, written by IGT, published in 2001.
Free Fall Poker Game Description, written by IGT, published before May 31, 2003.
Game King 5.1 Poker Advertisement, written by IGT, published in 2003.
Game King Multi-Game 4.0 Poker Plus Advertisement, written by IGT, published in 2002.
Game King Poker Advertisement, written by IGT, published in 2002.
Game King Series Ten Play Draw Poker Advertisement, written by IGT, published in 2002.
Game King Series Triple Play-Five Play Draw Poker Advertisement, written by IGT, published in 2001.
Game King Video Poker Advertisement, written by IGT, published in 2001.
Jackpot Party Brochures and Articles written by WMS Gaming, Inc., published in 1998.
Little Green Men Brochure and Article written by IGT/Strictly Slots, published in 2000.
Morehead & Mott-Smith, Hoyle's Rules of Games, Second Revised Edition, Description of Poker on pp. 34 to 63, Description of Hold'em Poker on pp. 47-48, New American Library, New York, 1983.
Price is Right-Cliff Hanger Advertisement written by IGT, published in 2001.
Surf Fruits-Catch the Wave Advertisement, written by Unidesa Gaming, published before May 31, 2003.
Wave Watchers Advertisement, written by Atronic Casino Technology, published in 2002.
Website, Kemps, <http:www.pagat.comcommercekemps.html>, published before May 31, 2003.
Website, Schwirnmen, <http:wwwpagat.comcommerceschwim.html>, published before May 31, 2003.
Website, Golden Chariots, written by WMS Gaming, <http://www.wms.com/game-detail.php?Themes=642> published before Mar. 10, 2008.
Website, Double Easy Money, written by WMS Gaming, <http://www.wms.com/game-detail.php?Themes=644> published before Mar. 10, 2008.
Website, Reels O'Doublin, written by WMS Gaming, <http://www.wms.com/game-detail.php?Themes=643> published before Mar. 10, 2008.
Website, Mystical Fortunes, written by WMS Gaming, <http://www.wms.com/game-detail.php?Themes=662> published before Mar. 10, 2008.
Website, Crazy Diamonds, written by WMS Gaming, <http://www.wms.com/game-detail.php?Themes=681> published before Mar. 10, 2008.
Website, Stroke of Luck, written by WMS Gaming, <http://www.wms.com/game-detail.php?Themes=452> published before Mar. 10, 2008.
Website, Video Slot Machine: WMS Gaming: Hot Hot Penny, written by WMS Gaming, <http://videoslotmachines.com/wms/hothotpenny.htm> published before Mar. 10, 2008.

* cited by examiner

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

400

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

402

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

500

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

500

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

502

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

600

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

600

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

| HAND RANK | 1 coin pays | 2 coins pays | 3 coins pays | 4 coins pays | 5 coins pays |
|---|---|---|---|---|---|
| Royal Straight Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 1 | 2 | 3 | 4 | 5 |
| Jacks or Better | 1 | 2 | 3 | 4 | 5 |

GAMING SYSTEM, GAMING DEVICE AND METHOD FOR PROVIDING DRAW POKER GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets five cards dealt face up from a 52 card deck of playing cards. The player can discard none, one, a plurality or all of the five cards. Each discarded card is replaced with another card from the deck. After the replacement, the cards are evaluated for winning combinations. For a five card poker game, there are ten general categories of hands, ranked from highest to lowest, as shown in Table 1 below.

TABLE 1

Ranking of Five Card Poker Hands by Category

| Rank | Name | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three of a Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of Straight Flush, Four of a Kind, or Flush, there are over a hundred equivalent hands for each two pair variation, and there are over 1,000 equivalent hands for each type of no-pair hand.

Numerous variations of poker exist, including Five Card Draw as mentioned above, Three Card Poker, Five Card Stud, Seven Card Stud, Hold'em (also called Texas Hold'em), Omaha (also called Omaha Hold'em), and Pai-Gow Poker. The variations in these games generally differ in the manner in which cards are dealt and in the manner and frequency in which bets are placed. Various criteria may also be used to determine the winning hand, including highest ranking hand, lowest ranking hand (Low-Ball), and where the high and low hands each win half of the pot (High-Low).

The number of cards dealt and the ability to draw or replace cards depends on the particular variation of poker being played. In typical video-based Five Card Draw Poker games, a player receives five cards from a virtual deck of cards to form an initial player hand. The player is able to replace any or all of the cards where the replacement cards are drawn from the virtual deck of cards. In a Five Card Draw Poker game, a player selects a hold input associated with a particular card to signify that they would like to keep that card. The number of discarded cards are replaced with cards from the virtual deck to form the final player hand. The final player hand is compared to a paytable and the gaming system provides any awards based on the rank of the player's hand. Other variations of Five Card Draw Poker exist, such as Deuces Wild. In this variation, any Two in a player's hand functions as a wild card. In typical Three Card Poker games, the player plays against a dealer hand and the player and dealer hands include a total of three cards. In certain known Three Card Poker games, the initially dealt player hand and dealer hand are final and there is no option to replace or draw any new cards. In stud poker games, such as Five Card Stud and Seven Card stud, the players receive a number of cards dealt face-down and a number of cards dealt face-up. In typical stud games, the player is not allowed to draw or replace cards in the player hand.

The poker variation of Three Card Poker is generally played with a single deck of playing cards, where the player plays against a dealer hand rather than against other players. Certain variations of Three Card Poker include one or more side-games. In one example, there is a Play/Ante game where a prayer plays against the dealer hand to determine who has the highest hand. Also, there is a side-game commonly referred to as the Pair Plus game. In this secondary or side game, the player wages on whether or not the player will be dealt a pair or better. Certain gaming establishments allow wagering on either of the games and other gaming establishments require a player to make an Ante Bet in order to participate in the Pair Plus portion of the game.

In one common multiplayer version of Three Card Poker, there are three wagering areas at each player position on a gaming table. One wagering area labeled Pair Plus is where the player puts a wager on the Pair Plus game. For the base game, there are two wagering areas labeled Ante and Play. The game starts with a player placing a wager in the Pair Plus and/or Ante circle. After all the players have placed their wagers, the dealer deals three cards face-up to each player. In general, if a player has wagered an Ante they must make a decision to fold or continue playing after looking at their hand. If the player folds, the Ante wager is forfeited without the player having ever determined if his/her hand would have beaten the dealer's hand. If a player wishes to continue, the player is required to place an additional wager in the Play wagering area equal to their Ante bet. For example, if a player wagered five credits on the Ante bet, the Play wager would also be five credits. Accordingly, the player can make a relatively small initial wager to see their cards and determine if they want to continue with the game.

After all the players have determined whether to forfeit or continue playing, the dealer reveals his/her three card hand. According to certain Three Card Poker rules, the dealer must qualify with a hand of Queen or higher for play to continue. If the dealer's hand does not contain a Queen or higher, all active players are paid even money for their Ante wager even if their hand is a lower hand than the dealer hand. Also, the Play wager is returned to the player. If the dealer's hand qualifies, then the dealer's hand is compared to the player's hand. If the player's hand outranks the dealer's hand, the player is paid even money for both the Ante wager and the Play wager. If the dealer's hand beats the player's hand, the player loses both wagers. If the rank of the player's hand is the same as the dealer's hand, the player wins the wager or pushes depending on the house rules.

The hand rankings for Three Card Poker are different than the hand ranking for Five Card Poker as listed in Table 1 above. This is because the mathematical probabilities of making certain hands are different for Three Card Poker and because there are less cards (e.g., you cannot achieve two-pair when you only have three cards). The Three Card Poker hands are generally ranked from the highest to the lowest as shown in Table 2 below:

TABLE 2

Ranking of Three Card Poker Hands by Category

| Rank | Name | Example |
|---|---|---|
| 1 | Straiqht Flush | K♣Q♣J♣ |
| 2 | Three of a Kind | Q♠Q♥ Q♦ |
| 3 | Straight | 8♦ 7♣6♠ |
| 4 | Flush | A♣J♣8♣ |
| 5 | One Pair | K♦ K♠8♣ |
| 6 | No Pair | A♥ 10♣7♦ |

The Pair Plus wager is based only on whether a player's three card hand has a pair or higher. The Pair Plus wager is paid based on a pay table established by the gaming establishment. Therefore, even if the player loses to the dealer, if the player has a hand rank of at least a pair, the player wins the Pair Plus Wager. Accordingly, the Pair Plus wager can be used to hedge against a frustrating loss to the dealer where the player has a good hand.

Certain players seek out variations to traditional card games such as Video Poker, Three Card Poker, Blackjack and Baccarat. A need therefore exists for new and exciting card games with high degrees of player interaction.

SUMMARY

Various embodiments of the present disclosure relate to a gaming system for providing a Five Card Video Draw Poker game, and methods of playing and operating a Five Card Video Draw Poker game at a gaming table or through a gaming device. Certain of the embodiments include a Video Draw Poker card game having a feature where a player can view and optionally discard one or more draw cards. This feature enables the player to optimize their card holding or card drawing strategies based upon greater information and enables the player to improve their odds of winning based upon greater draw-card control than is available in a traditional Video Draw Poker game. Although Five Card Video Draw Poker is used in several examples described below, it should be appreciated that the embodiments are not limited to Five Card Video Draw Poker and may include other suitable video or non-video based cards games.

In one embodiment, a gaming system is provided having a Five Card Video Draw Poker game. The gaming system causes an initial five card hand to be dealt to the player face-up and also causes a first draw card to be revealed to the player. The player has the option to keep or discard the first draw card. After the player has decided whether or not to keep the first draw card, the gaming system enables the player to replace one or more cards in the initial player hand. If the player selects to discard the first draw card, this card will not be used as a replacement or draw card to form the final player hand. In an embodiment, if the player discards the first draw card the remaining draw cards are not visible to the player. However, in other embodiments, one or more additional draw cards may become visible to the player. In these embodiments, where the player is able to view and optionally discard the first draw card, the player is able to avoid the disadvantage of getting stuck with a poor first draw card (i.e., a card that does not help in improving the rank of the final hand). Additional draw cards may be displayed as a standard part of the game, or the ability to view additional draw cards may be purchased by the player at a particular point in the play of the game.

In certain draw poker embodiments, to compensate for the advantage to the player of being able to view and/or discard a draw card, the card game may be funded, at least in part, by lowering an average expected payout. In certain other embodiments, additional wagers or side wagers and/or other betting requirements may be employed to fund the game. In an example of a Five Card Video Draw Poker embodiment having a five credit maximum wager, the game is funded by requiring an additional wager to be placed to enable the peek and burn features. In this example, if a player wagers a sixth credit, the gaming system enables the player to view one of the draw cards. If the player wagers a seventh credit, the gaming system enables the player to view one of the draw cards and optionally burn or discard the draw card.

In certain draw poker embodiments having a peek and/or draw card burn option, the card game is funded by one or more additional wagers. A point in a play of the game when the player must or may place the additional wager(s) can be varied. In one embodiment, the player must place sixth and seventh wagers at the beginning of the play of the game and prior to having viewed the five cards in the initial player hand. Therefore, if the player only places a sixth credit wager at the beginning of a round of play of the game (i.e., to view a draw card), the player does not later have the option to place a seventh credit to burn or discard the viewed draw card. In another embodiment, the player can optionally place the sixth and seventh credit wagers after the player has seen the five cards in the initial player hand. In another embodiment, the player must place the sixth credit wager at the beginning of the play of the game in order to be allowed to peek or view one of the draw cards. In this embodiment, after the player has viewed the five cards in the initial player hand and viewed the first draw card, the player may optionally place a seventh credit wager to allow the player to burn or discard the draw card. It should be appreciated that the number of additional credits required to fund the game may be varied, and the timing in a play of the game when the wagers must or may be placed may also be varied in any suitable manner.

In certain Five Card Video Draw Poker embodiments, the player first selects cards to replace in the initial five card player hand prior to having the ability to view one or more of the draw cards. In these embodiments: the player also has the ability to discard or burn one of the draw cards. However, in contrast to the embodiments described above, if the player does not exercise the option to discard the first draw card, the player retains the option to discard the second (or a subsequent) draw card. That is, if the player elects to keep the first draw card, the gaming system will cause the display of a second card and the player has the option of keeping or discarding the second draw card. This process continues until all of the discarded cards in the initial player hand have been replaced or until the player elects to discard one of the draw cards. Therefore, after the player selects which cards to hold, the player can see each new draw card in turn, and decide if and when to execute the option to discard one of the draw cards. Once the player exercises the option to burn or discard a draw card, any remaining draw cards are automatically dealt. Accordingly, the player has added flexibility in determining which of the draw cards wilt be eliminated. However, in contrast to the embodiments described above, the player must make the card holding decisions before being able to view any of the draw cards in the alternative embodiments. In further embodiments, the gaming system enables the player to view one or more of the draw cards before making suitable decisions to hold or draw cards.

In other Five Card Video Draw Poker embodiments, the player selects cards to replace (or to hold) in the initial player hand after having viewed one or more of the draw cards. In these embodiments, the player can postpone the decision to commit to discarding (or holding) certain cards in the initial player hand until after at least a first draw card has been viewed. In one example embodiment where the player can only exercise the burn option on the first draw card, the player must select which of the initial five player cards to hold or discard after the decision to burn or retain the first draw card has been made. In another embodiment, where the player can view more than one draw card before exercising the option to burn or discard a draw card, the player must select which of the initial five player cards to hold or discard after electing whether or not to burn the first draw card. In this embodiment, the gaming system does not allow a player to view more that one draw card until the player has designated cards to hold in the initial five card player hand. In another embodiment, the player can place additional wagers to further postpone setting the hold cards in the initial five card player hand. In one example, if the player would like to see a second draw card before setting the cards in the player hand, an additional wager is required to offset any advantage to the player.

In one embodiment of a Five Card Video Draw Poker game, the gaming system reveals the first draw card prior to revealing the initial five card player hand. In this embodiment, the player has the option to hold or discard the first draw card. However, the player must make this decision without the benefit of having seen any of the cards in the initial player hand. In certain embodiments, the gaming device reveals at least one but less than all of the cards in the initial five card player hand prior to the player's decision to hold or discard the first draw card. In these embodiment, the player has at least some knowledge of the player's hand when making a decision to hold or discard the first draw card. In one embodiment, the player is required to place an additional wager in order to view a subset of cards in the initial five card player hand prior to making a decision to hold or discard the first draw card.

Additional features and advantages are described herein, and will be apparent from, the following Detailed Description and the figures.

BRIEF DESCRIPTION OF THE FIGURES

FIG. 2B is a schematic diagram of the data network that one or more of the gaming devices of the present disclosure may be connected to.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment, and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
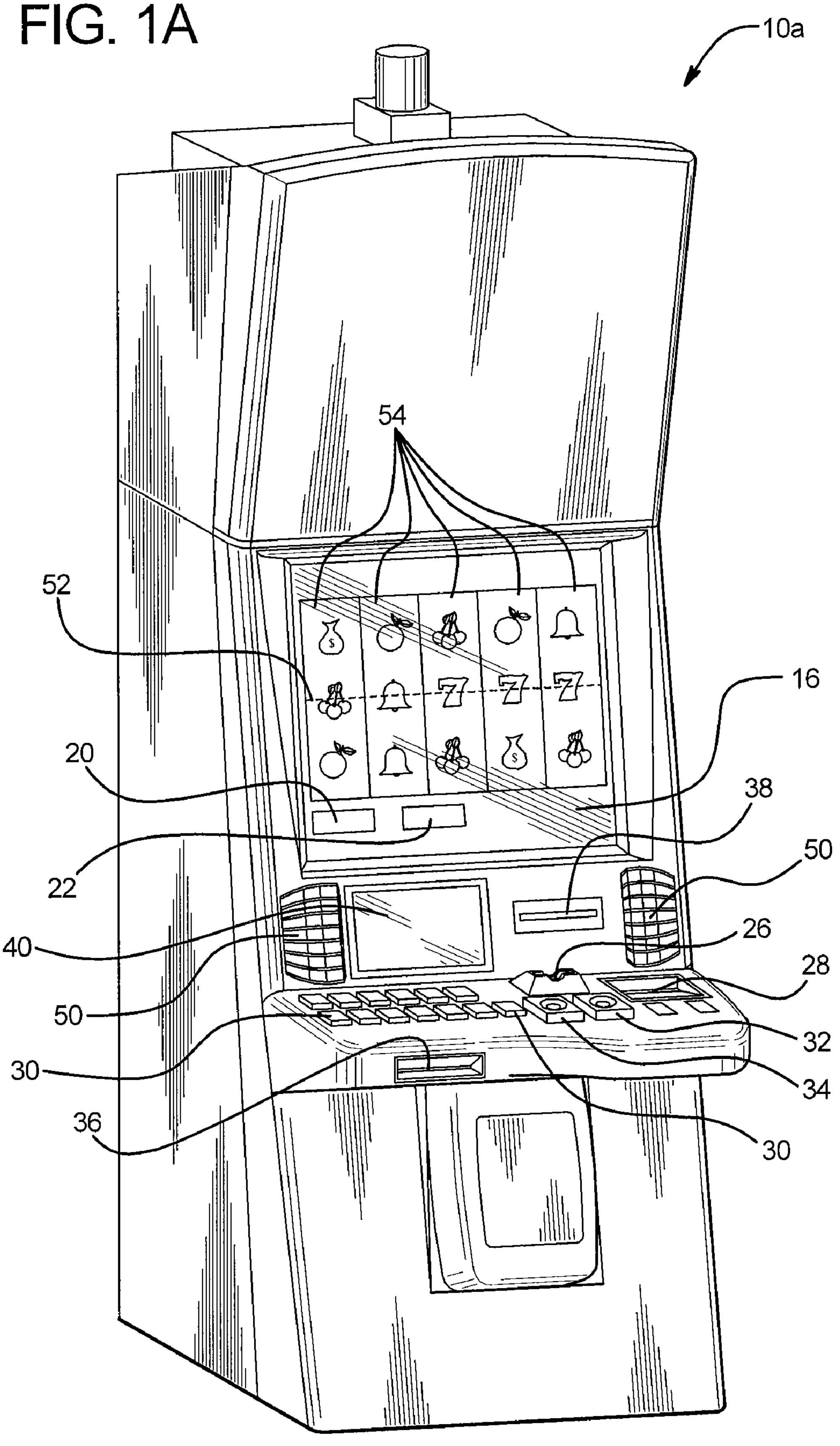
FIG. 1A is a front perspective view of one embodiment of the gaming system of the present disclosure.
Figure 1B:
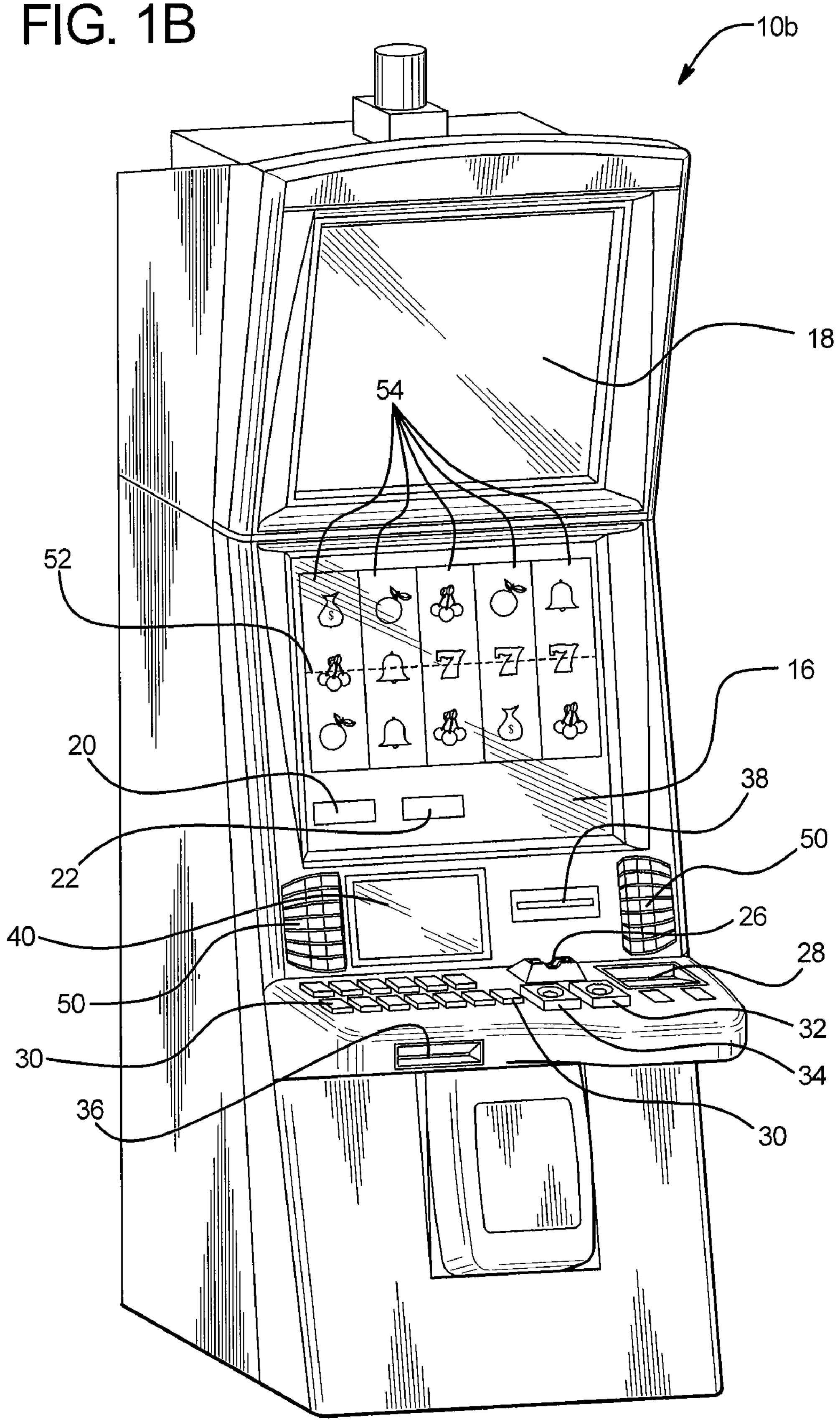
FIG. 1B is a front perspective view of one embodiment, of the gaming system of the present disclosure.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B the gaming device may have varying cabinet and display configurations.

Figure 2A:
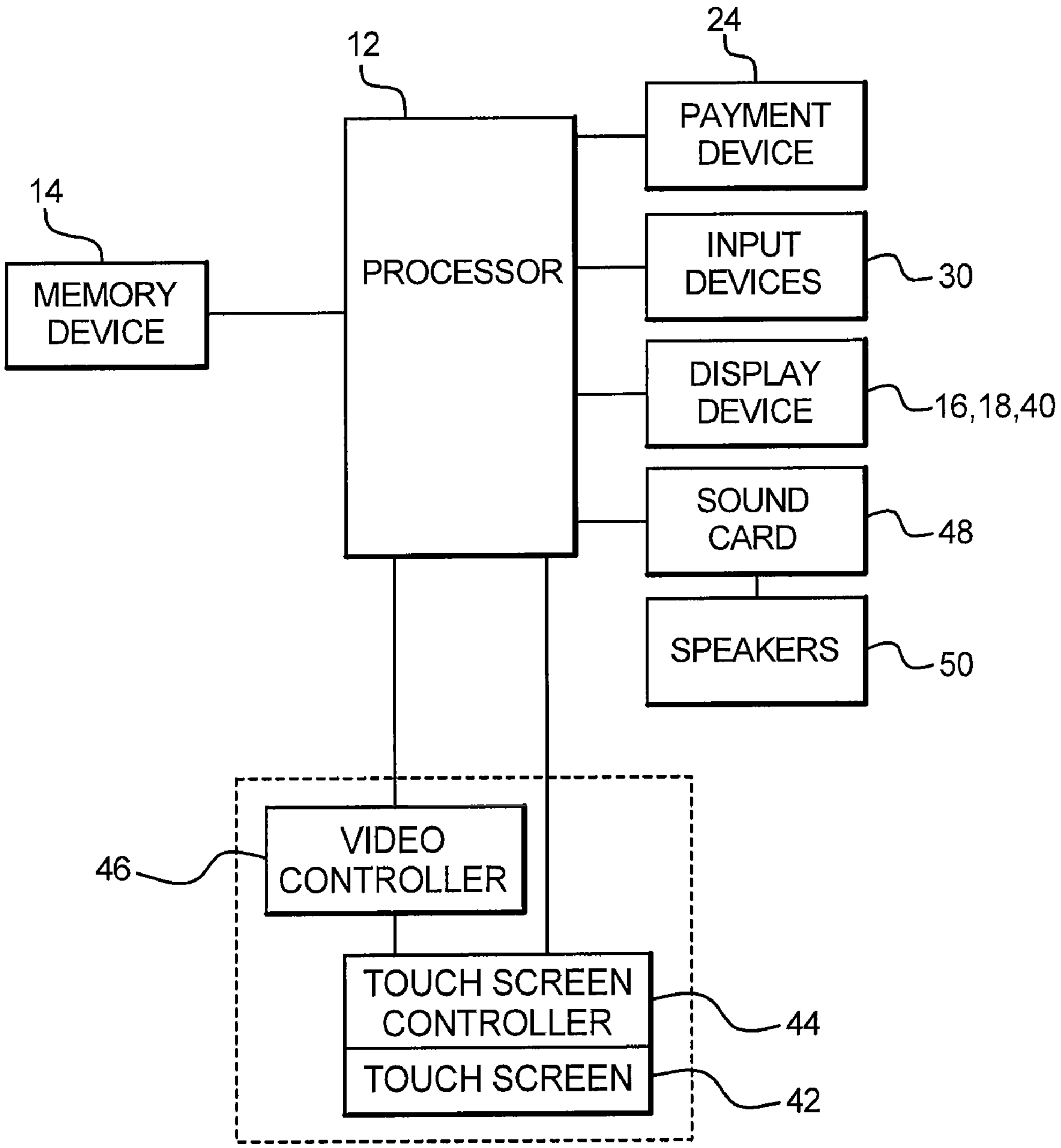
FIG. 2A is a schematic diagram of the electronic configuration of one embodiment of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM): which can include non-volatile RAM (NVRAM): magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a poker game wherein the gaming device enables the player to play a conventional game of video draw poker and initially deals five cards all face up from a virtual deck of fifty-two cards.

Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
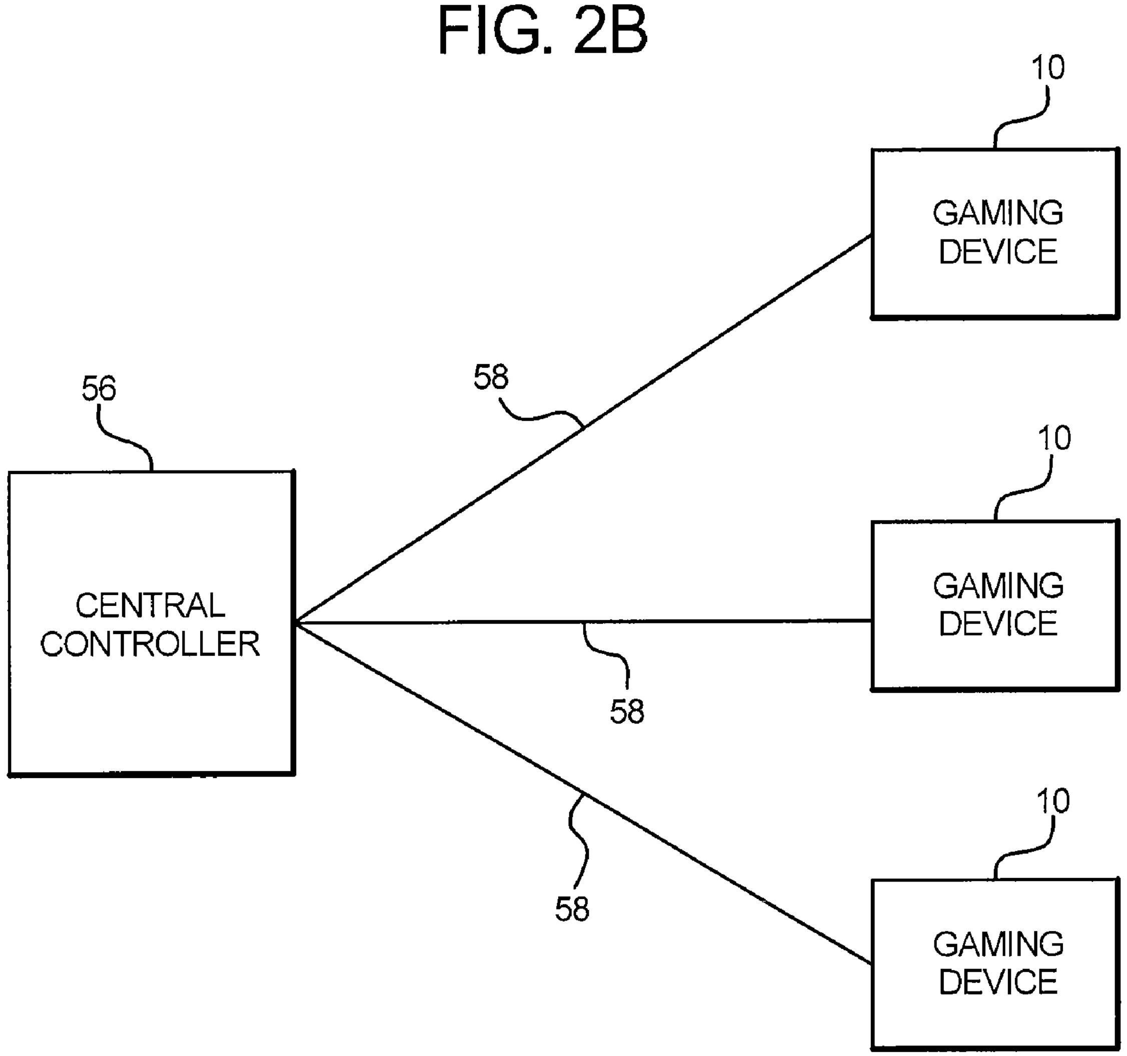

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a realtime or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified players gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Five Card Draw Poker Game Embodiments

In one embodiment, the gaming system or gaming device provides a draw poker game and enables a player to view the value of the first draw card prior to selecting which, if any, cards to hold. Therefore, based on the value of the first draw card, a player may choose to hold or discard different cards depending on different game play strategies. FIGS. 3A to 3F describe the general concept of a player being able to view an additional card that may replace a card in an initial player hand (or add a card to the initial player hand), where this general concept is applied to a Five Card Video Draw Poker game. However, it should be appreciated that this general concept can be used in conjunction with any suitable card game including, but not limited to, Blackjack, Three Card Poker and Baccarat.

Figure 3A:
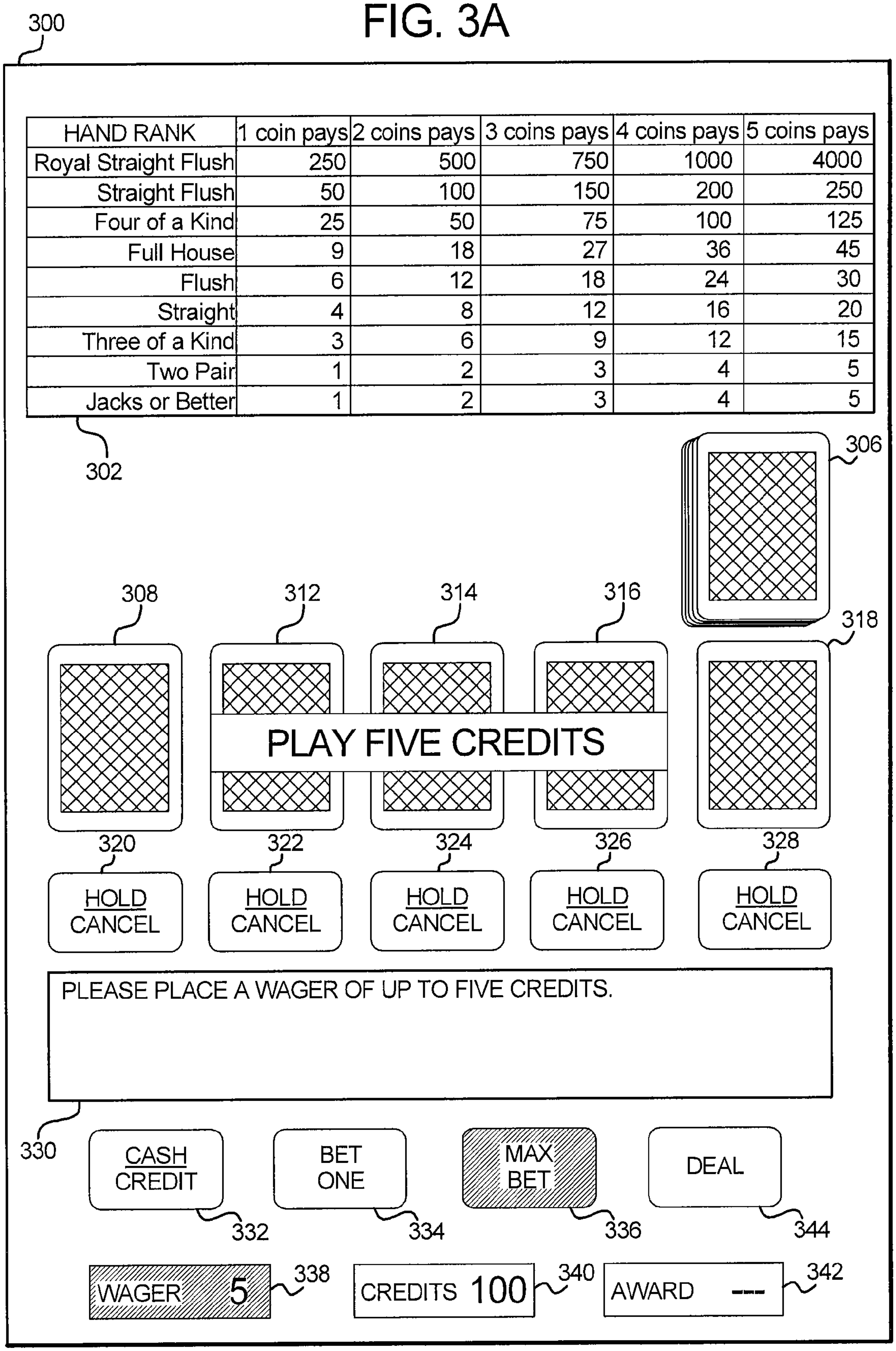
FIGS. 3A, 3B, 3C, 3D, 3E and 3F are illustrations of screen displays for first and second rounds of the game, of one embodiment.

As shown in FIG. 3A, the gaming system 300 includes a display having a number of inputs, message areas and other information. In one embodiment, the display of the gaming system 300 includes a payout chart 302. In the example shown in FIG. 3A, the payout chart 302 includes a number of hand ranks including a Royal Straight Flush, a Straight Flush, a Four of a Kind, a Full House, Flush, a Straight, a Three of a Kind, Two Pair, and a single pair of Jacks or Better. Each of the different ranks have an associated payout according to the number of credits wagered. In this example, the award for a Royal Flush with five coins wagered is a proportionally large award. It should be appreciated that any suitable payout amounts may be used with different ranking hands, and that certain ranking hands may not payout any awards.

The display of the gaming system 300 also includes a virtual deck of draw cards 306, five player card positions 308, 312, 314, 316 and 318, hold inputs 320, 322, 324, 326 and 328, and a message display 330. The display of the gaming system 300 includes a cash/credit input 332, a bet one input 334, a max bet input 336, a deal input 344, a wager display 338, a credits display 340 and an awards display 342. It should be appreciated that in other embodiments, any suitable number or arrangement of inputs and displays may be used to facilitate the play of the game. The display may further include a touch screen input such that a player may hold cards or provide other input through the touch screen interface.

Figure 3B:
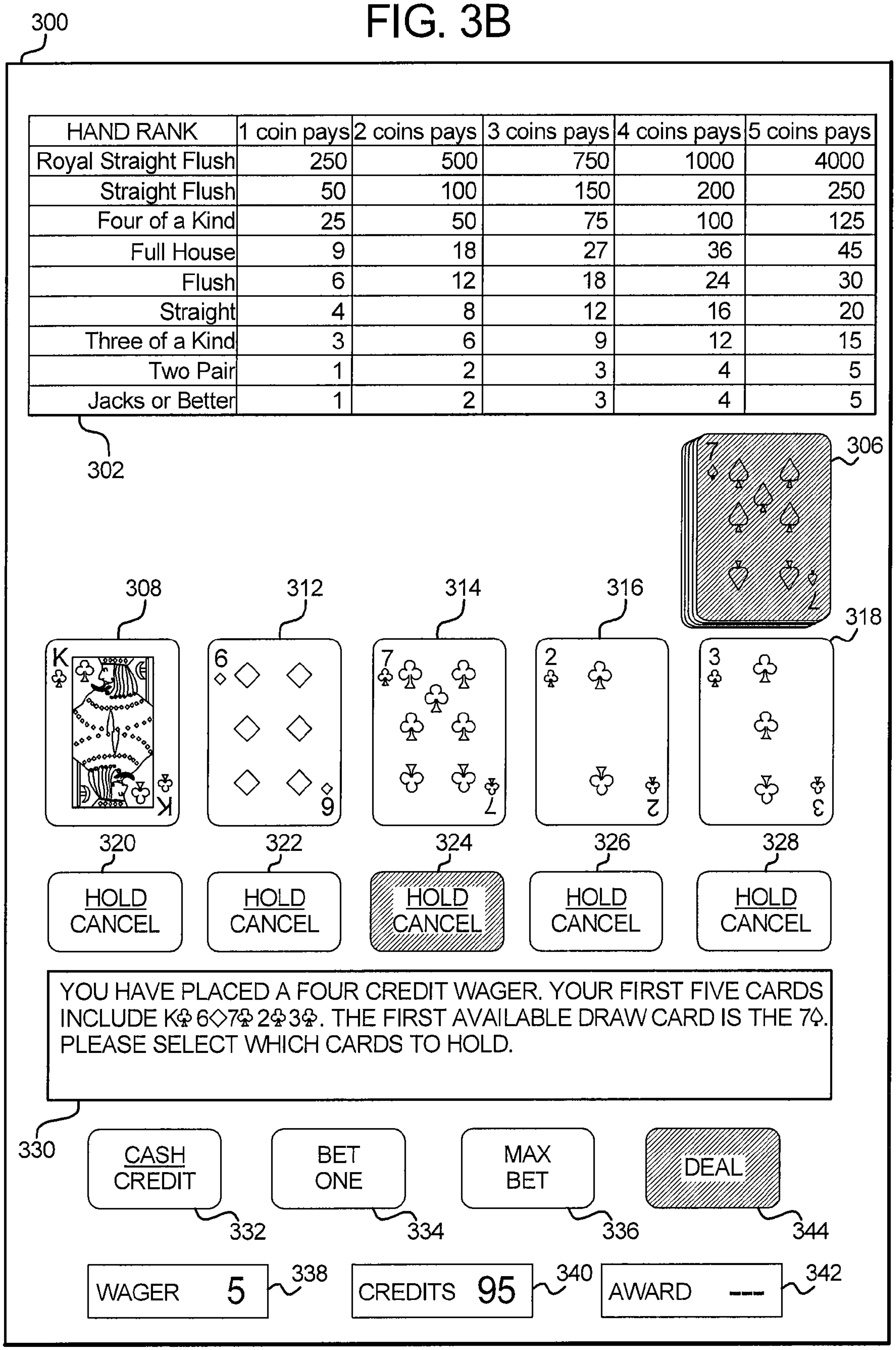

As shown in FIG. 3A, the gaming system 300 begins a round of play of the game by causing five player cards to be dealt face down in player card positions 308, 312, 314, 316 and 318, and prompting a player to place a wager, as indicated in the message display 330. In this example play of the game, the player has chosen to wager the maximum number of five credits, as indicated by the activated max bet input 336 and the wager display 338. As shown in FIG. 3B, the gaming system 300 indicates the player's wager in the message display 330 and reveals the values of the five player cards. In this example play of the game, the card in the first player card position 308 is the K♣, the card in the second player card position 310 is the 6♦, the card in the third player card position 314 is the 7♣, the card in the fourth player card position 316 is the 2♣, and the card in the fifth player card position is the 3♣. Therefore, the player's cards include four clubs for a possible Flush. According to optimal strategy in a standard Five Card Draw video poker game, the player would select to hold the four clubs in the first, third, fourth and fifth player card positions 308, 314, 316 and 318. However, in this embodiment, the gaming system 300 also causes the first draw card 306 to be revealed to the player, as indicated in FIG. 3B. In this example play of the game, because the player can view the draw card and knows it to be a spade, the player would not choose to discard the 6♦ in the second player card position 312 because the draw card would not complete a club Flush.

The gaming system 300 prompts the player to select which cards to hold, as indicated in the message display 330. In this example play of the game, the player chooses to hold only the 7♣, as indicated by the activated hold input 324 and the activated deal input 344. At this point, because the player knows that the first draw card is a 7♠, the player also knows that the final player hand will include at least a pair of sevens. In addition, because the player chose to hold only one card, the player will receive three additional draw cards in addition to the revealed 7♠ draw card 306.

Figure 3C:
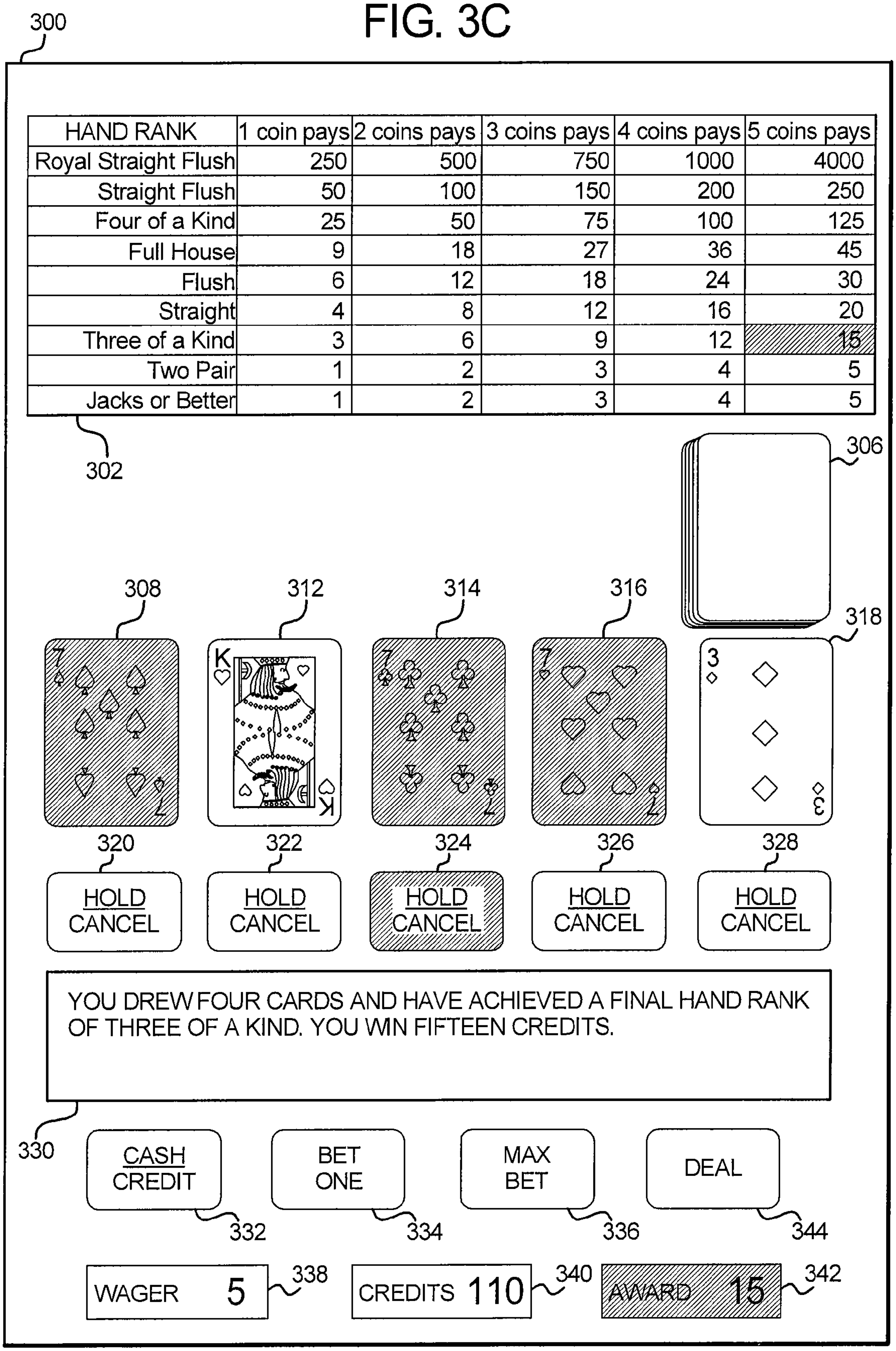

As shown in FIG. 3C, the gaming system 300 causes four draw cards to be dealt to replace the discarded cards in player card positions 308, 312, 316 and 318, The replacement cards include the previously revealed 7♠, the K♥, the 7♥, and the 3♦. The gaming system 300 determines the rank of the final five card player hand and provides any awards to the player. In this example play of the game, the final player hand includes a Three of a Kind of sevens, as also indicated in message display 330. Because the player placed an initial wager of five credits, the gaming system 300 provides the player with an award of fifteen credits, as indicated in the message display 330 and the award display 342. The gaming system 300 also updates the total amount of player credits from ninety-five to one-hundred ten, as indicated in the credits display 340. This ends this example round of play of the game. As shown from this example, the ability for a player to see the value of the first draw card can change the optimal card holding strategy.

Figure 3D:
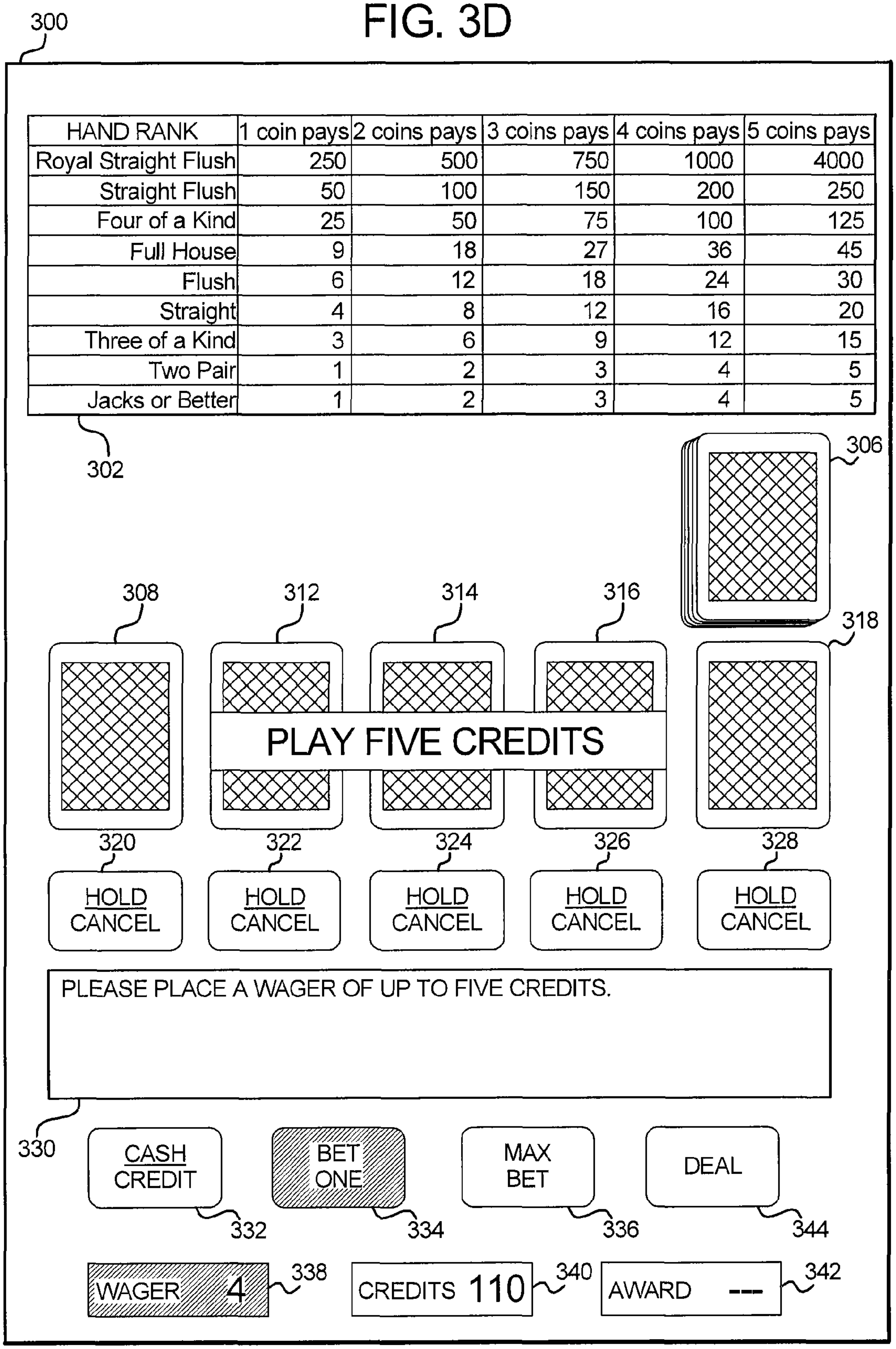
Figure 3E:
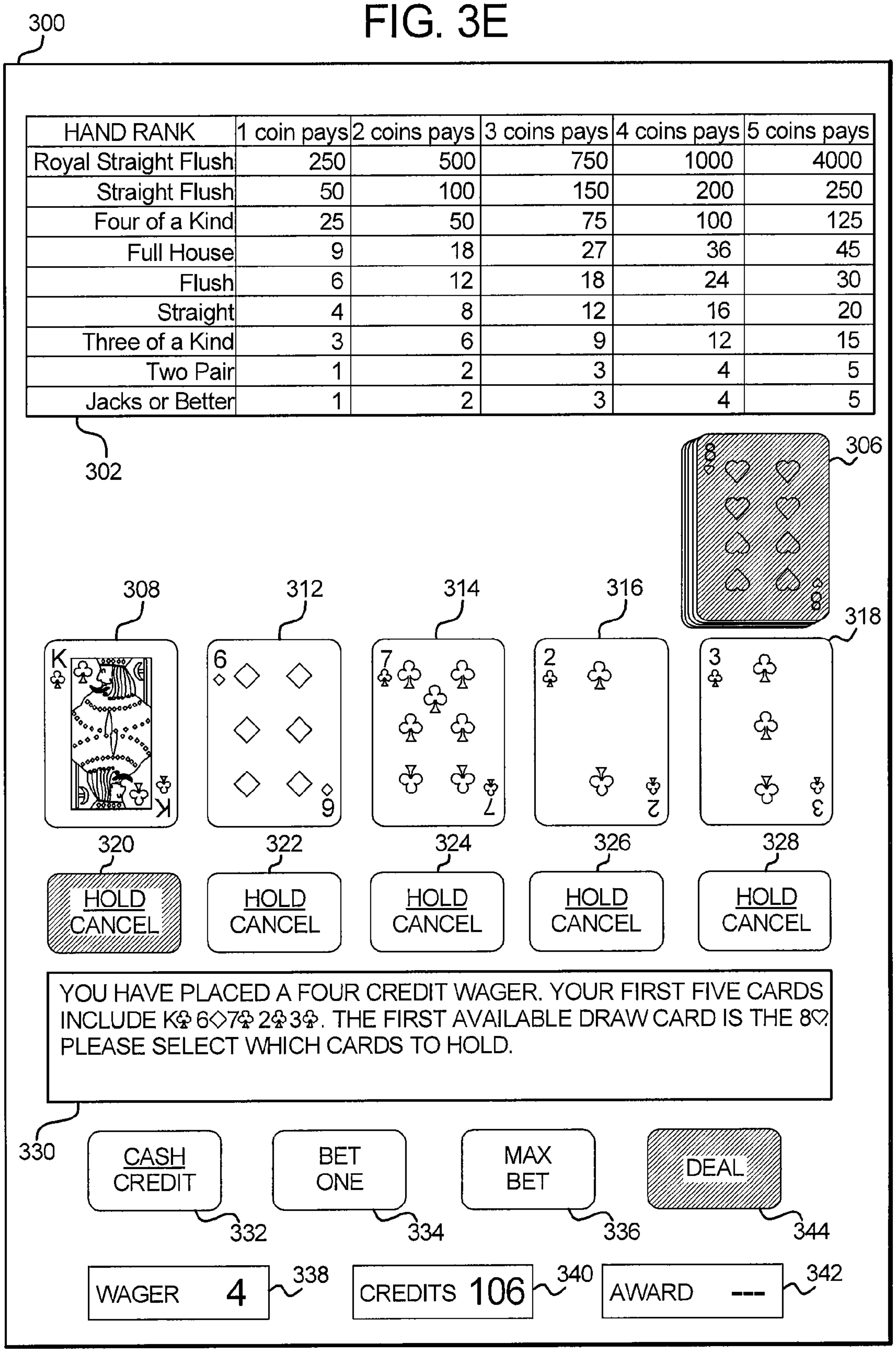
Figure 3F:
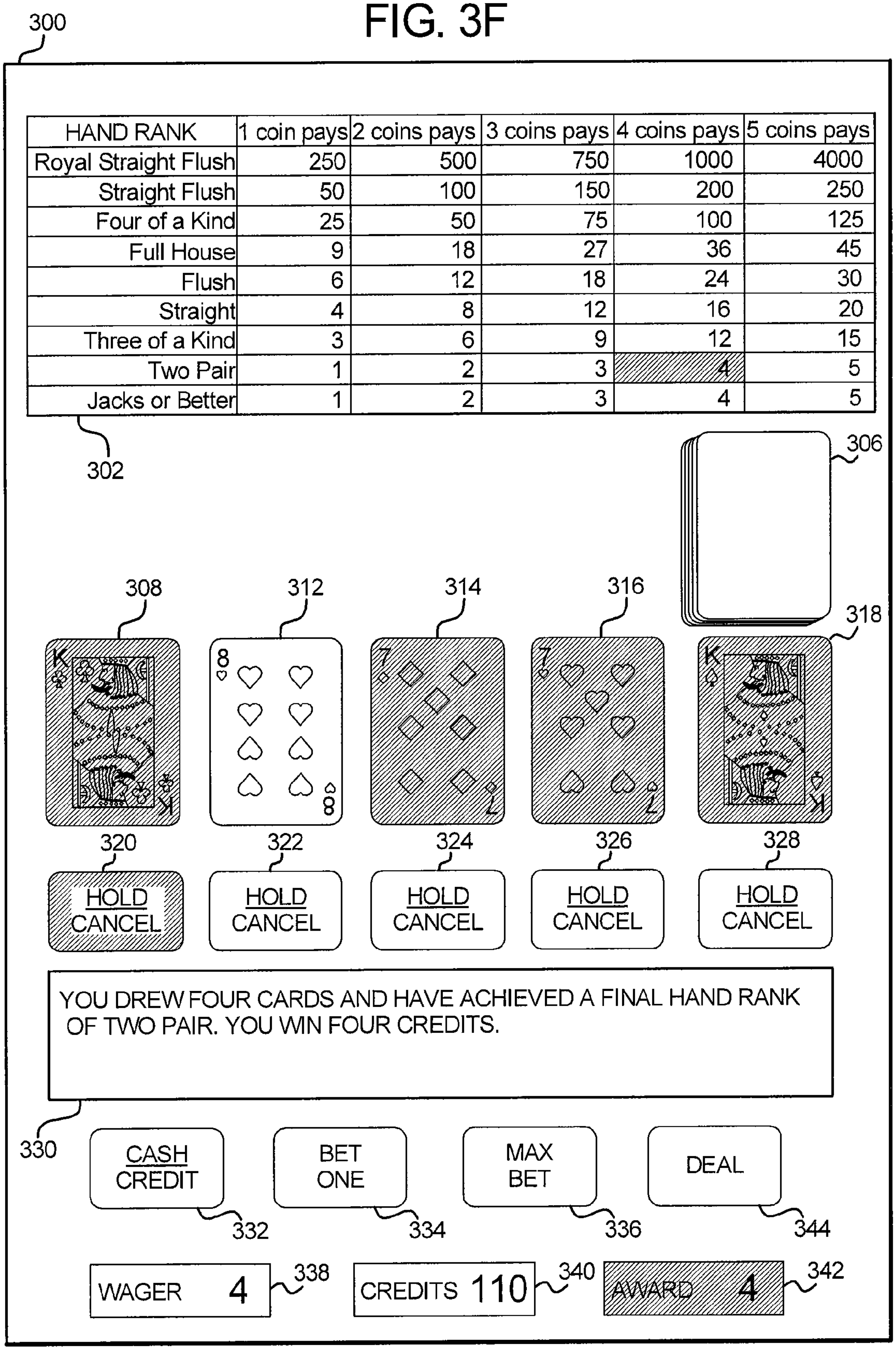

FIGS. 3D to 3F show a second round of play of the game, in the embodiment. In this round of play of the game, the player wagers four credits, as indicated in FIG. 3D by the activated bet one input 334, and the wager display 338. As shown in FIG. 3E, the gaming system 300 deals five cards in the first player card position 308, the second player card position 312, the third player card position 314, the fourth player card position 316 and the fifth player card position 318. The player's first five cards include the K♣ 6♥ 7♣ 2♣ 3♣, as indicated also in the message display 330. The gaming system 300 also reveals the first draw card 306, which is the 8♥. As the first example discussed above with respect to FIGS. 3A to 3C, the first draw card of 8♥ will not help the player to form a club flush. Moreover, in this example, the 8♥ does not form a pair and would only form three cards to a possible Straight (i.e., if the player were to hold the 6♦ and the 7♣). Accordingly, in this example play of the game, the revealed first draw card 306 is not particularly helpful to the player, except that the player knows not to attempt to draw a single card for a flush. The gaming system 300 prompts the player to select which cards to hold, as indicated in the message display 330. The player chooses to hold the K♣ in the first player card position 308, and discard the remaining four cards, as indicated by the activated hold input 320 and the activated deal input 344. At this stage, because the first draw card 306 is the 8♥, the player knows that the final hand will include K♣, 8♥ and three additional unknown draw cards.

As shown in FIG. 3F, the gaming system 300 causes the previously revealed draw card and three additional draw cards to replace the cards in player card positions 312, 314, 316 and 318. The final player hand includes the K♣ 8♥ 7♠ 7♥ K♠, for a final hand rank of Two Pair. The gaming system 300 causes an award of four credits to be provided to the player, as indicated in message display 330, credit display 340, and award display 342. This ends this example round of play of the game. In both of the examples described above, under common draw poker rules, a player would likely choose to hold the four initially dealt clubs (i.e., K♣ 7♣ 2♣ 3♣) to try for a Flush. However, because the gaming system 300 causes the first draw card to be revealed to the player, the player is able to change their card holding strategies based on the additional information. In the two examples described above, the player was able to hold different cards to obtain awards.

Figure 4A:
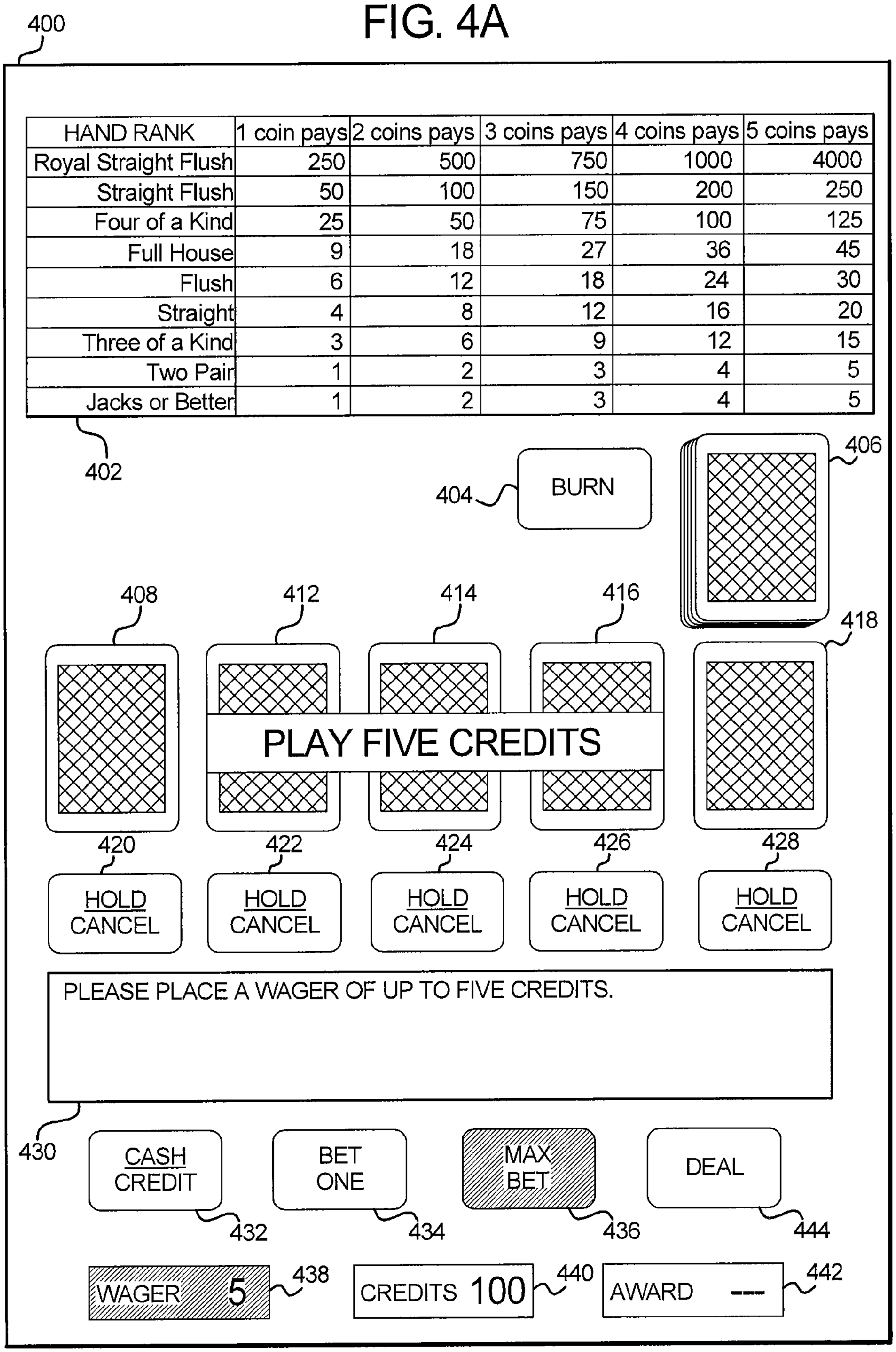
FIGS. 4A, 4B, 4C and 4D are illustrations of screen displays for a round of play of the game, of one embodiment.

In one embodiment, the gaming system provides a draw poker game where the player is enabled to view the value of the first draw card prior to selecting which, if any, cards to hold. In this embodiment, the gaming system enables the player to burn or discard the first revealed draw card. Therefore, based on the value of the first draw card, a player may choose to discard the first draw card, and to hold or discard different player cards depending on a particular game play strategy. As shown in FIG. 4A, the gaming system 400 includes a display having a number of inputs, message areas and other information similar to the elements described above with respect to FIGS. 3A to 3F. In addition, the display of the gaming system 400 includes a burn input 404 that enables the player to retain or discard the first revealed draw card 406. In an example, the burn input 404 may be toggled between a burn state by activating the input once, and a hold state by activating the input a second time. In one embodiment, functionality of the burn input 404 is similar to the functionality of the hold inputs 420, 422, 424, 426 and 428, where the player can change the state of the input any number of times prior to activating the deal input 444. However, it should be appreciated that the user interface may include any other suitable input device or method for enabling the player to indicated whether or not the player would like to burn the draw card.

Figure 4B:
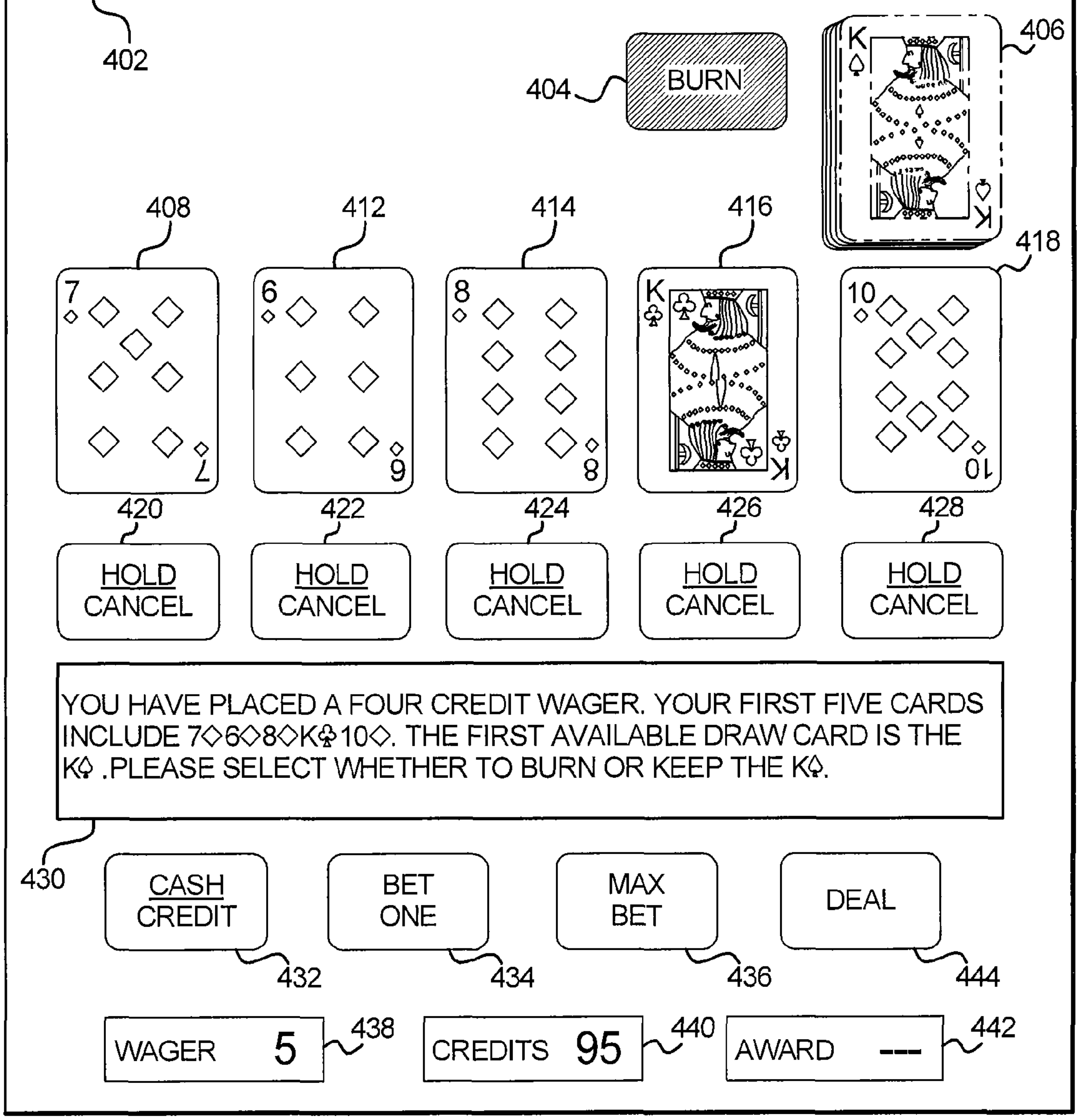

As shown in FIG. 4A, the gaming system 400 initiates a round of play of the game and prompts the player to place a wager, as indicated in message display 430. In this example round of play of the game, the player has chosen to wager the maximum of five credits, as indicated by the activated max bet input 436 and the wager display 438. As shown in FIG. 4B, the gaming system 400 causes five cards to be dealt to player card areas 408, 412, 414, 416 and 418. In this example round of play of the game, the initial five player cards include 7♦ 6♦ 8♦ K♣ 10♦, as indicated in message display 430. Therefore, in this round of play of the game, the player has four out of five cards to form a Straight Flush. The gaming system 400 causes the first draw card 406 to be revealed to the player. The first draw card 406 is a K♠. The gaming system 400 prompts the player to burn or keep the first draw card 406, as indicated in the message display 430. In this example play of the game, the player has chosen to burn the first draw card 406, as indicated by the activated burn input 404 with burn designation. It should be appreciated that the player could have chosen to keep the first draw card 406 and later hold only the K♣ in the fourth player card position 416. This would have provided the player with a pair of Kings and three additional draw cards. However, by burning the first draw card 406, the player is able to obtain an additional draw card to try for the higher paying award associated with a Straight Flush.

Figure 4C:
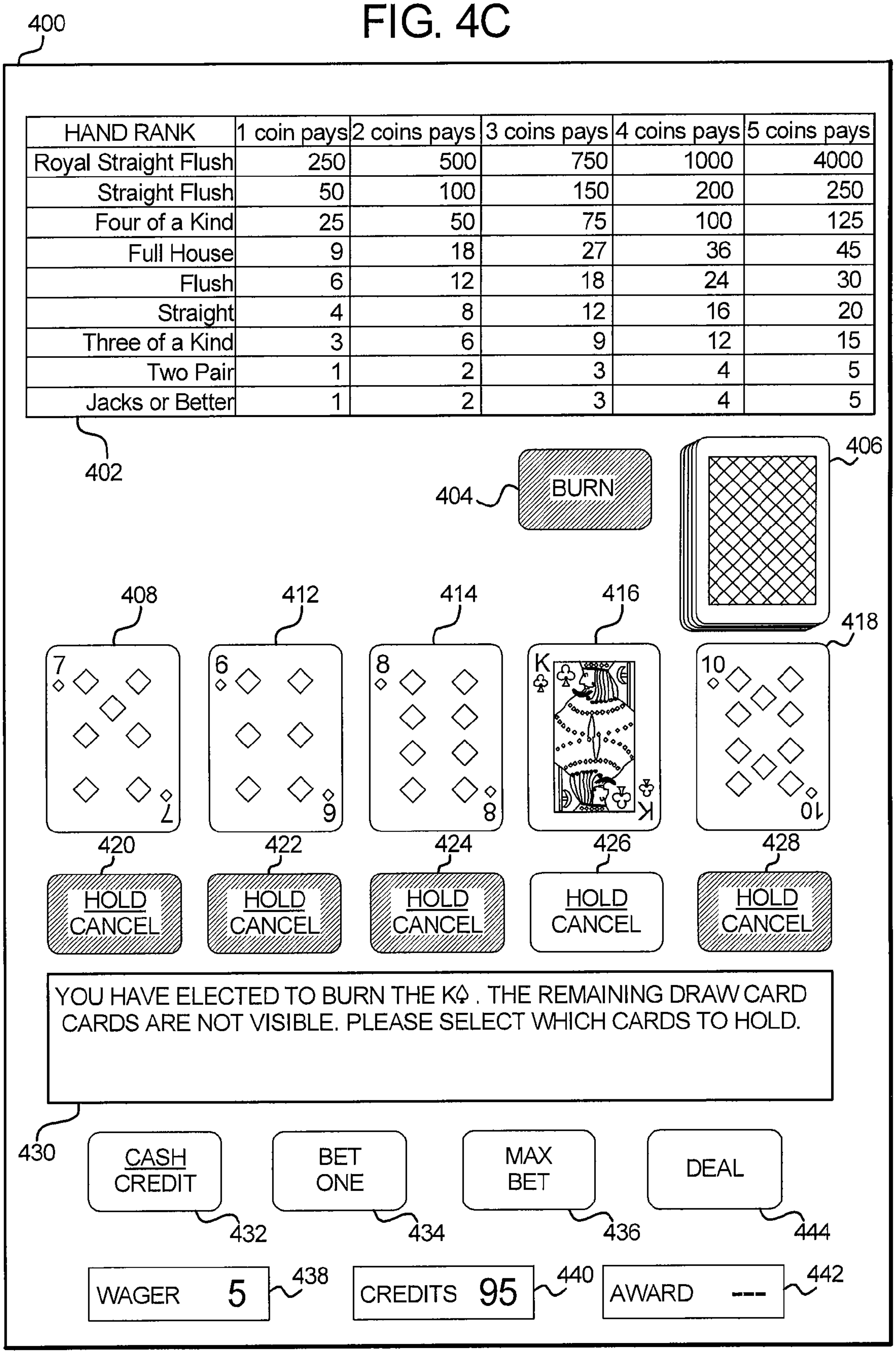

As shown in FIG. 4C, after the player has elected to burn the first draw card 406, the gaming system 400 discards or otherwise eliminates the K♠ from the available draw cards. In this embodiment, if the first player card 406 has been burned, the remaining draw cards are not visible to the player, as also indicated in message display 430. The gaming system 400 prompts the player to hold one or more of the player cards. In this example play of the game, the player elects to attempt a Straight Flush of diamonds by holding the 7♦ in the first player card position 408, the 6♦ in the second player card position 412, the 8♦ in the third player card position, and the 10♦ in the fifth player cards position 418. This is also indicated by the activated hold inputs 420, 422, 424 and 428.

Figure 4D:
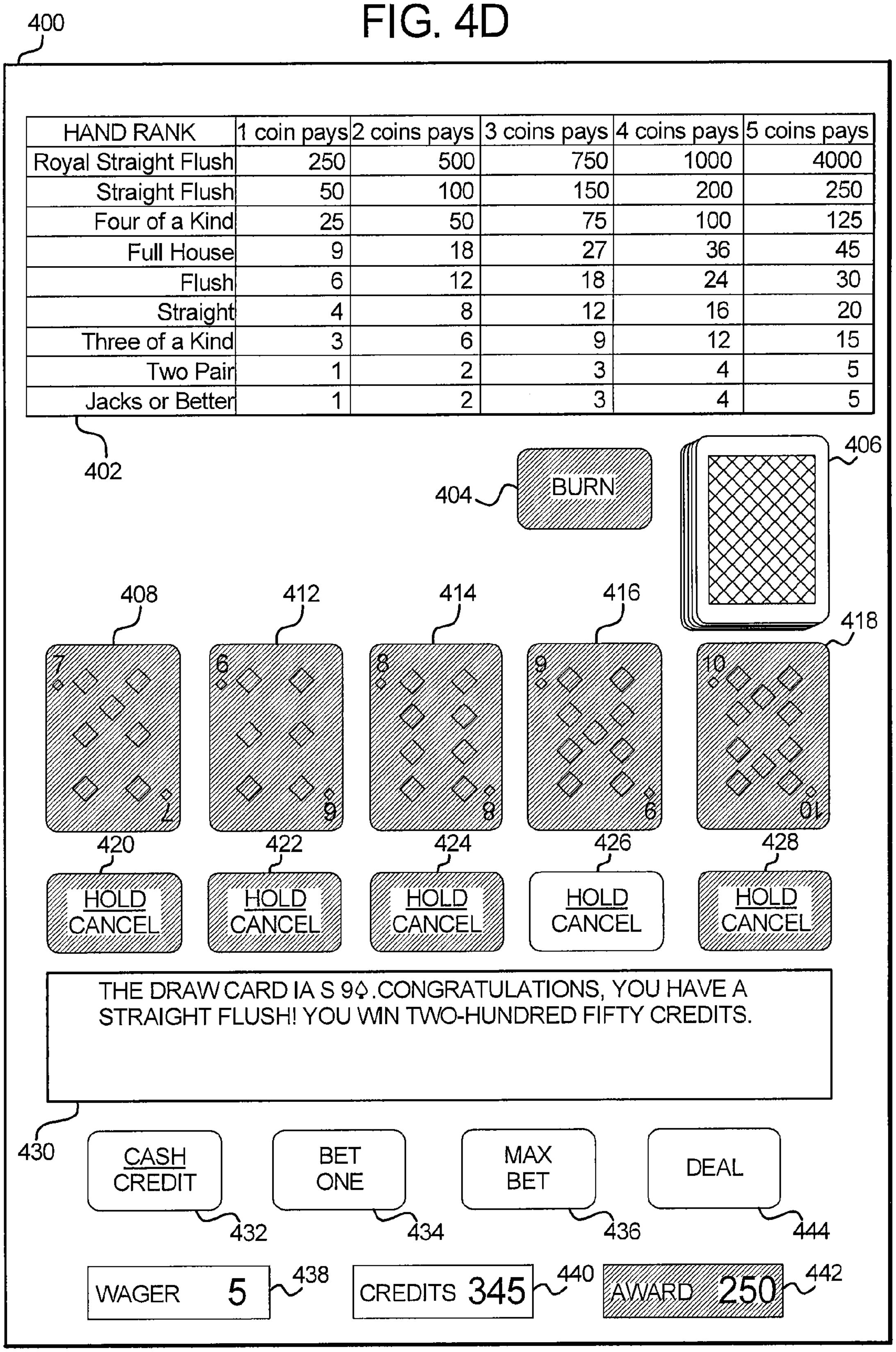

As shown in FIG. 4D, the gaming system 400 causes a single draw card to be dealt to replace the discarded K♣ in the fourth player card position 416. In this example play of the game, the draw card is the 9♦. The 9♦ completes a Straight Flush, as indicated by the highlighted cards in the first through fifth player card positions 408, 412, 414, 418 and 418 and the message display 430. The gaming system 400 causes an award of two-hundred fifty credits to be provided to the player, as indicated in the award display 442 and the message display 430. The gaming system 400 causes the total number of player credits to increase from ninety-five to two-hundred forty-five, as indicated by the credits display 440. This ends this example round of play of the game. In this embodiment, the gaming system 400 provides the player with an option to discard the first draw card if the card does not help the player's hand or the player believes that another draw card may help the player's hand to a greater degree. In this example, the large award associated with a possible Straight Flush caused the player to forego the certainty of a pair of Kings. It should also be appreciated that in this embodiment, if the player chooses to burn the first draw card, the gaming system 400 does not reveal any additional draw cards prior to the player selecting which of the five player cards to hold.

In one embodiment, the gaming system provides a draw poker game where the player is enabled to view the value of the first draw card prior to selecting which, if any, cards to hold. The gaming system also enables the player to burn or discard the first revealed draw card, as described above with respect to FIGS. 4A to 4D. However, in this embodiment, if a player places an optional wager and chooses to burn the first draw card, the gaming system causes a second draw card to be revealed prior to the player selecting one or more cards to hold. Therefore, based on the value of the first draw card, a player may choose to discard the first draw card and to hold or discard different player cards depending on a particular game play strategy. Moreover, if the player wants to be able to see the value of the second draw card subsequent to a first draw card burn, the player can pay an additional credit amount at the beginning of a round of play of the game.

Figure 5A:
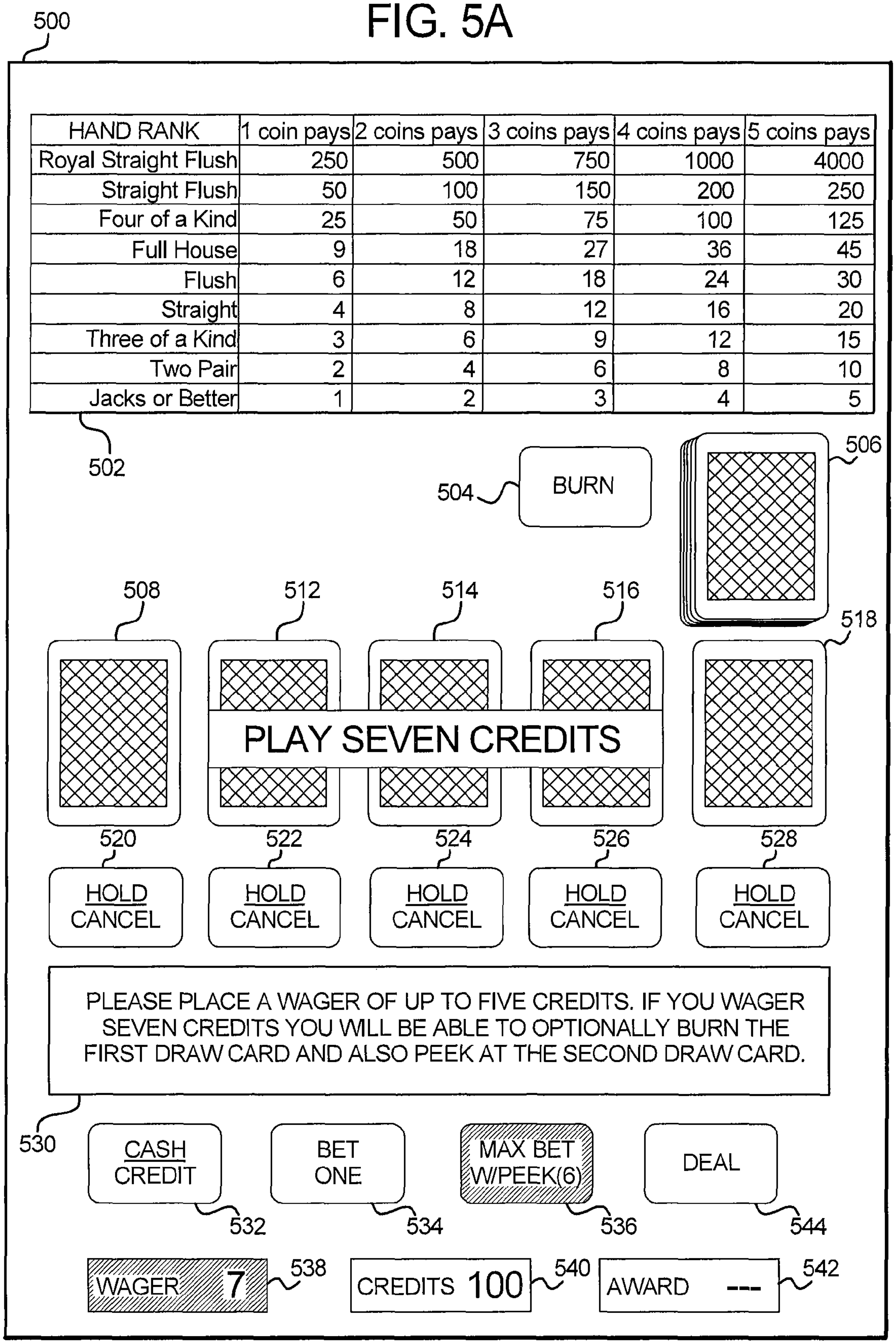
FIGS. 5A, 5B, 5C and 5D are illustrations of screen displays for a round of play of the game of one embodiment, where the player can purchase an option to view a second draw card prior to selecting hold cards.

As shown in FIG. 5A, the gaming system 500 includes a display having a number of inputs, message areas and other information similar to the elements described above. In addition, the display of the gaming system 500 includes a burn input 504 that enables the player to retain or discard the first revealed draw card 506. As shown in FIG. 5A, the gaming system 500 prompts the player to place a wager of up to seven credits, as indicated by the message display 530. The message display 530 also indicates that if the player places the maximum wager of seven credits, the player will have an option to burn the first draw card 506, and if the player elects to burn the first draw card 506, the player will also be able to view the second draw card. Therefore, the seventh wagered credit does not factor in the award table 502, but it enables the player the possible advantage of being able to view a second draw card. It should be appreciated that in other embodiments, if the player places the seventh credit, the gaming system will reveal the second draw card prior to player selection of hold cards regardless of whether the player chooses to burn or keep the first draw card.

Figure 5B:
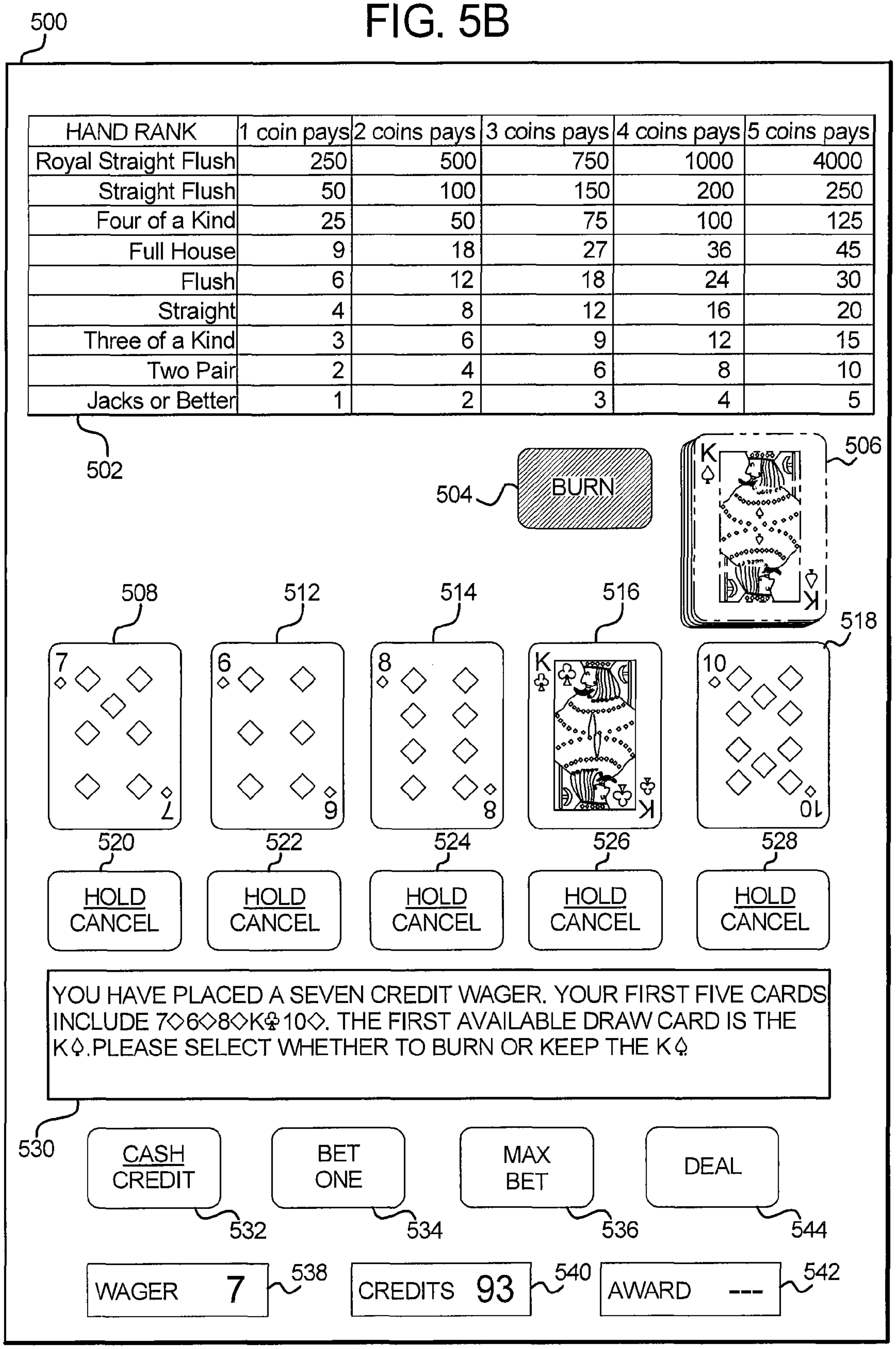

In this embodiment, an example round of play of the game is shown and described with respect to FIGS. 5A to 5D. As shown in FIG. 5A, the player has elected to place the maximum seven credit wager, as indicated by the activated max bet with peek input 536 and as indicated by the wager display. As shown in FIG. 5B, the gaming system 500 causes five cards to be dealt to the player card positions 508, 512, 514, 516 and 518. In this example round of play, the first five player cards include J♦ 6♦ 8♣ 10♦, as also indicated by message display 530. Therefore, the player has four out of five cards to form a diamond Flush. The gaming system 500 causes a first draw card 506 to be revealed and this card is the K♠, as also indicated in the message display 530. The gaming system 500 prompts the player to burn or to keep the first draw card 506, as indicated in message display 530. In this example, because the player is attempting to try for a flush, the player chooses to burn the first player card 506, as indicated by the activated burn input 504 with burn designation. Therefore, because the player has chosen to burn the K♠, the player has given up a guaranteed hand ranking of a One Pair (i.e., Jacks or Better) to try for the higher ranking Flush hand.

Figure 5C:
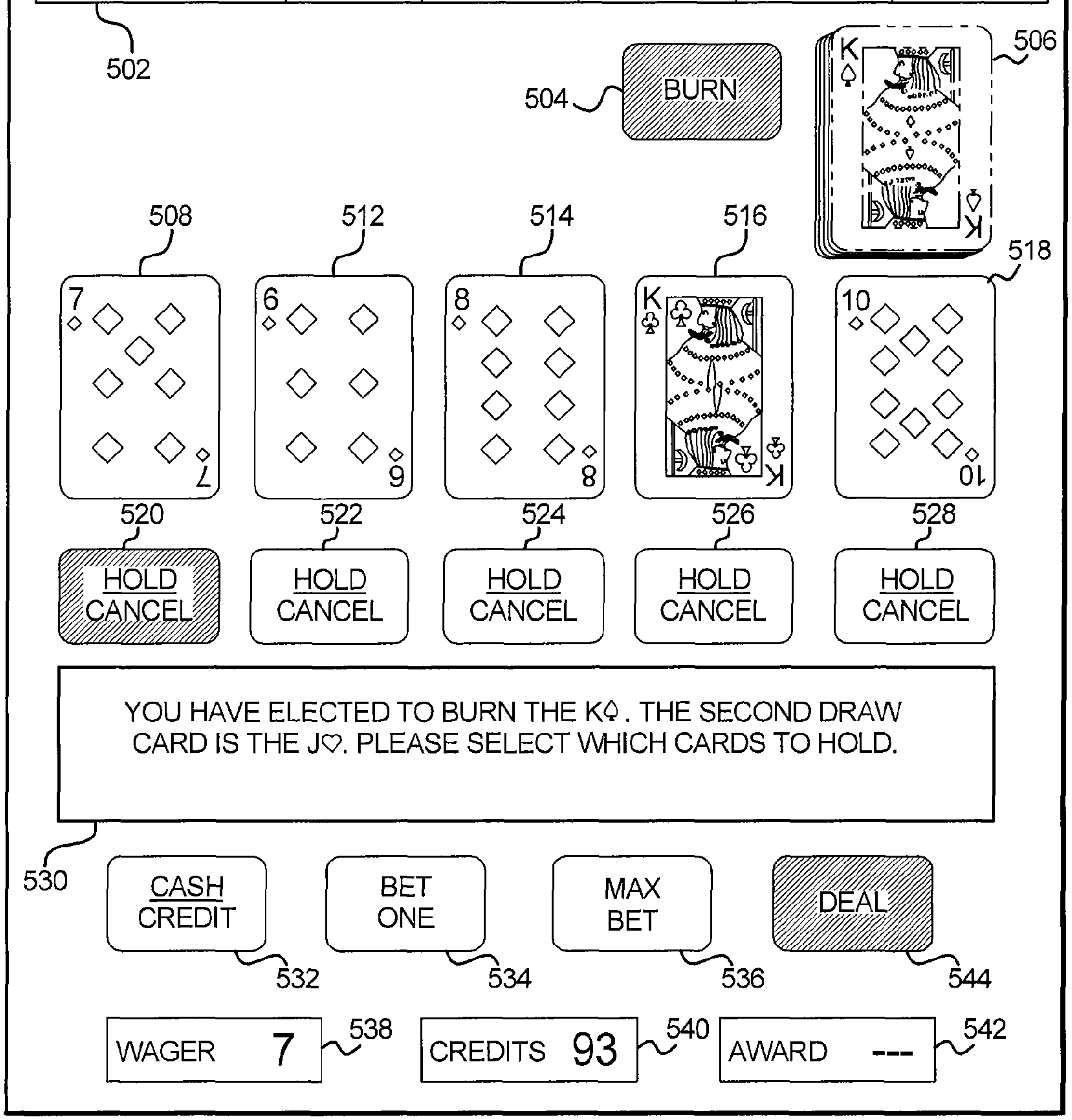

As shown in FIG. 5C, because the player had placed the max bet with peek seven credit wager, the gaming system 500 causes the second draw card to be revealed. The second draw card is the J♥, as also indicated by the message display 530. In this embodiment, the player is able to view the second draw card but is not able to burn the second draw card, as indicated by the deactivated burn input 504. In this example, J♥ does not complete the Flush for the player, but it gives the player a pair of Jacks. The gaming system 500 prompts the player to select which cards, if any, to hold, and indicated by the message display 530. The player chooses to hold only the J♦ in the first player card position 508, as indicated by the activated hold input 520 and the activated deal input 544. In this example round of play of the game, because the player chose to hold one card (i.e., the J♦) and because the player knows that the value of the second draw card is the J♥, the player is guaranteed a pair of Jacks. The player also receives three additional cards to replace the cards in the third, fourth and fifth player card positions 514, 516 and 518, respectively.

Figure 5D:
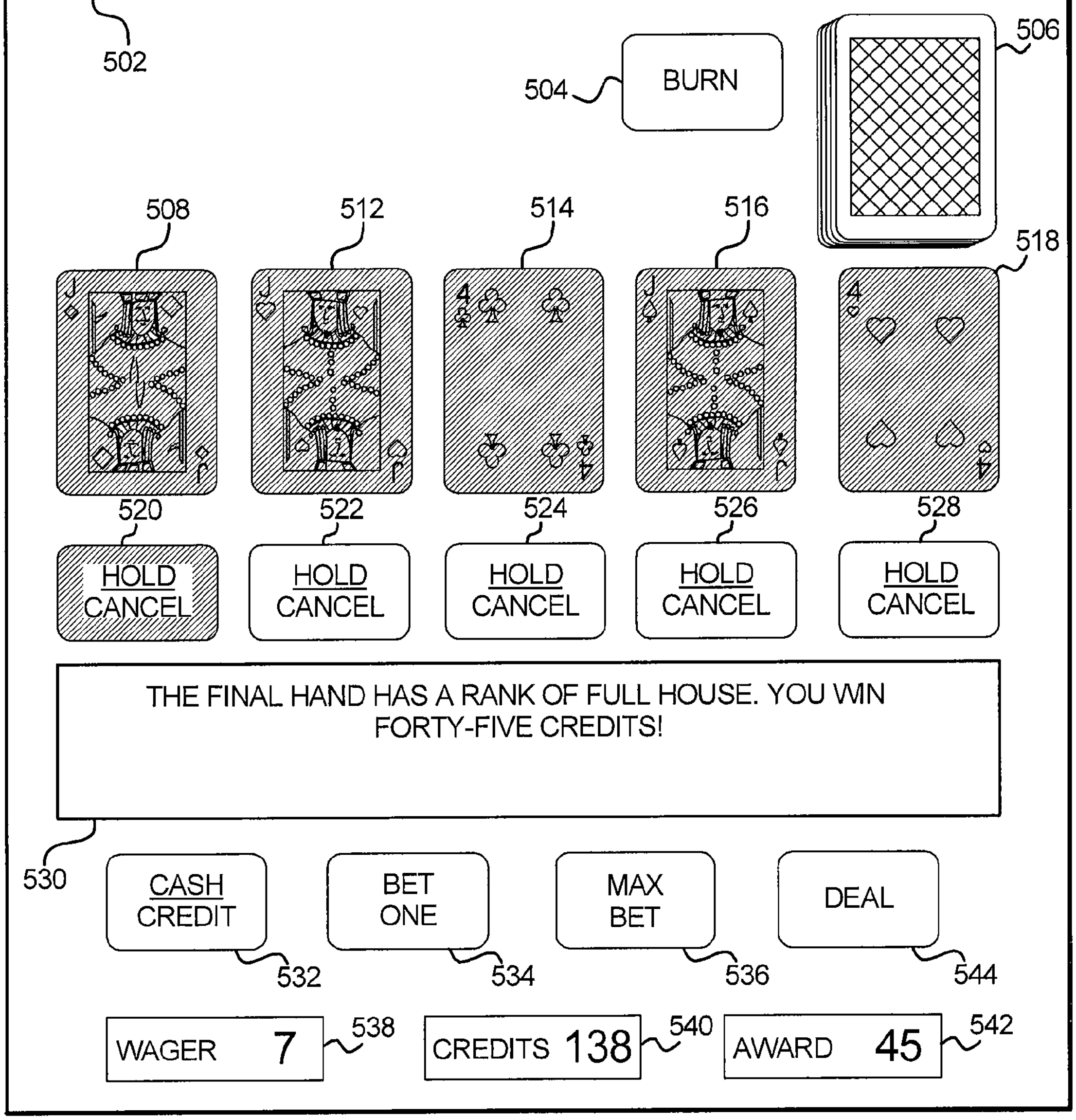

As shown in FIG. 5D, the gaming system 500 causes the second draw card (i.e., the J♥) to be moved to the second player card position 512. The gaming system 500 also deals three additional cards (i.e., 4♣ J♠ 4♥) to replace the cards in the third, fourth and fifth player card positions 514, 516 and 518. In this example play of the game, the rank of the final player hand is a Full House, as indicated by the message display 530. The gaming system 500 causes an award of forty-five credits to be provided to the player, as indicated in message display 530, and award display 542. The gaming system also causes the number of credits to be increased from ninety-three to one-hundred thirty-eight, as indicated by the credits display 540. This ends this example round of play of the game.

Accordingly, in this embodiment, the player is able to wager an additional credit amount to see the value of the second draw card (i.e., the player is able to purchase a possible extra peek). It should be appreciated that in other embodiments, different credit amounts may be required to purchase a peek, and the player may be able to purchase more than one peek. In another embodiment, the player can place the peek wager after the first draw card is revealed and is not required to place the maximum seven credit wager in order to purchase a peek. In another embodiment, if one extra credit is wagered, the gaming system allows the player one peek. If the maximum of seven credits is wagered, the gaming system randomly determines the number of peeks. In another embodiment, if the maximum of seven credits is wagered, the gaming system provides the player with a randomly determined number of burns. For example, the gaming device may provide the player with one, two, three or more opportunities to burn a potential draw. In this way, the player has the ability to filter through many different draw cards in order to find cards that work well in the player's hand. In an embodiment, the probability of the gaming system generating a higher number of burns is less than the probability of the gaming system generating a lesser number of burns.

In one embodiment, the player has an option to burn one of the draw cards after the player has made the hold selections on the original five card player hand. In this embodiment, if the player chooses to draw more than one card, the gaming system enables the player to burn any one of the draw cards. The gaming system causes the draw cards to revealed one at a time. After each draw card is revealed, the player has the option to burn the revealed draw card. Once the player has exercised the option to burn one of the draw cards, the gaming system deals the remaining draw cards to complete the final player hand. FIGS. 6A to 6G illustrate one example play of the game according to this embodiment.

Figure 6A:
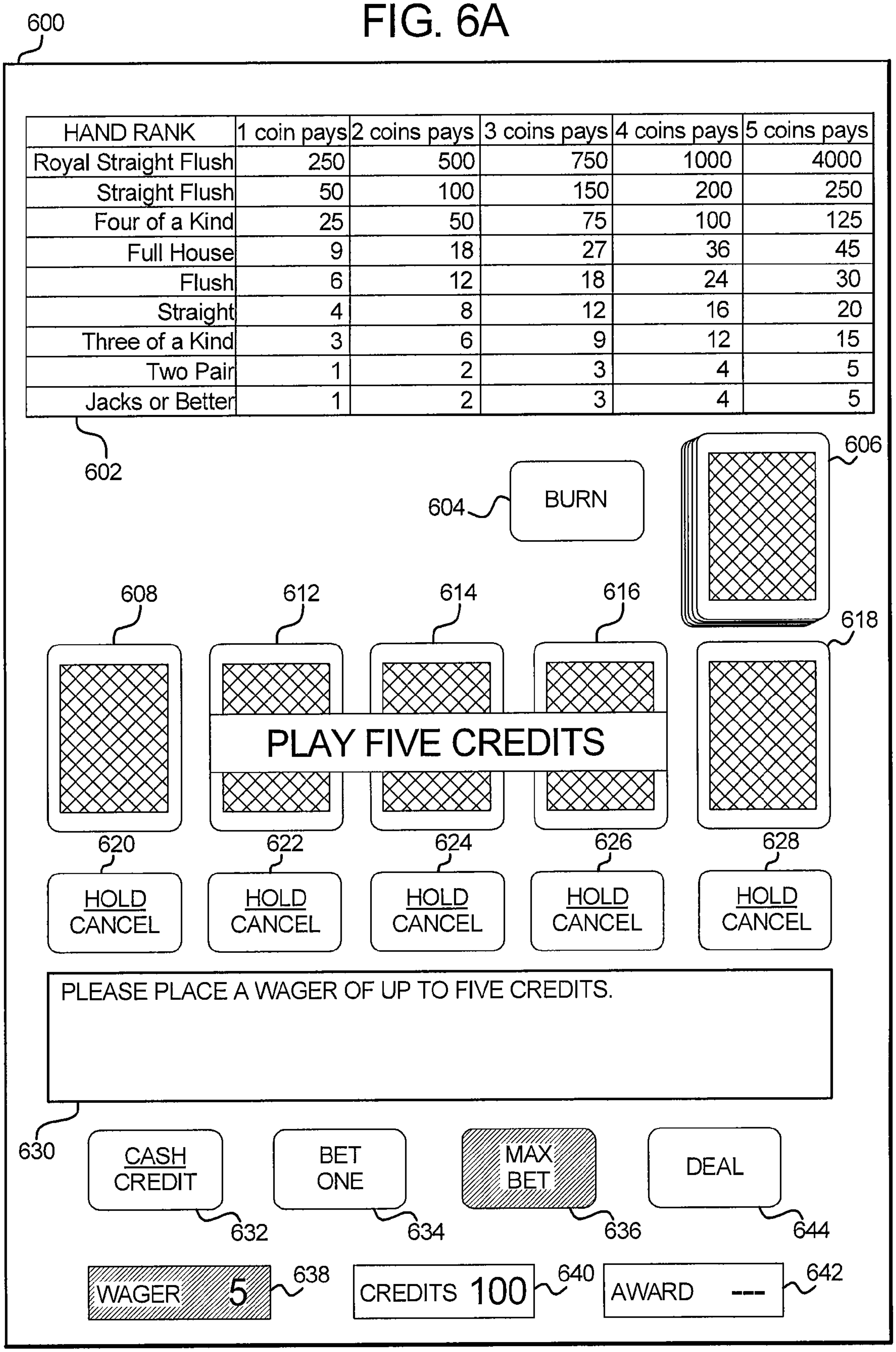
FIGS. 6A, 6B, 6C, 6D, 6E, 6F and 6G are illustrations of screen displays for a round of play of the game of one embodiment, where the player first sets hold cards and then has an option to discard one of the draw cards.
Figure 6B:
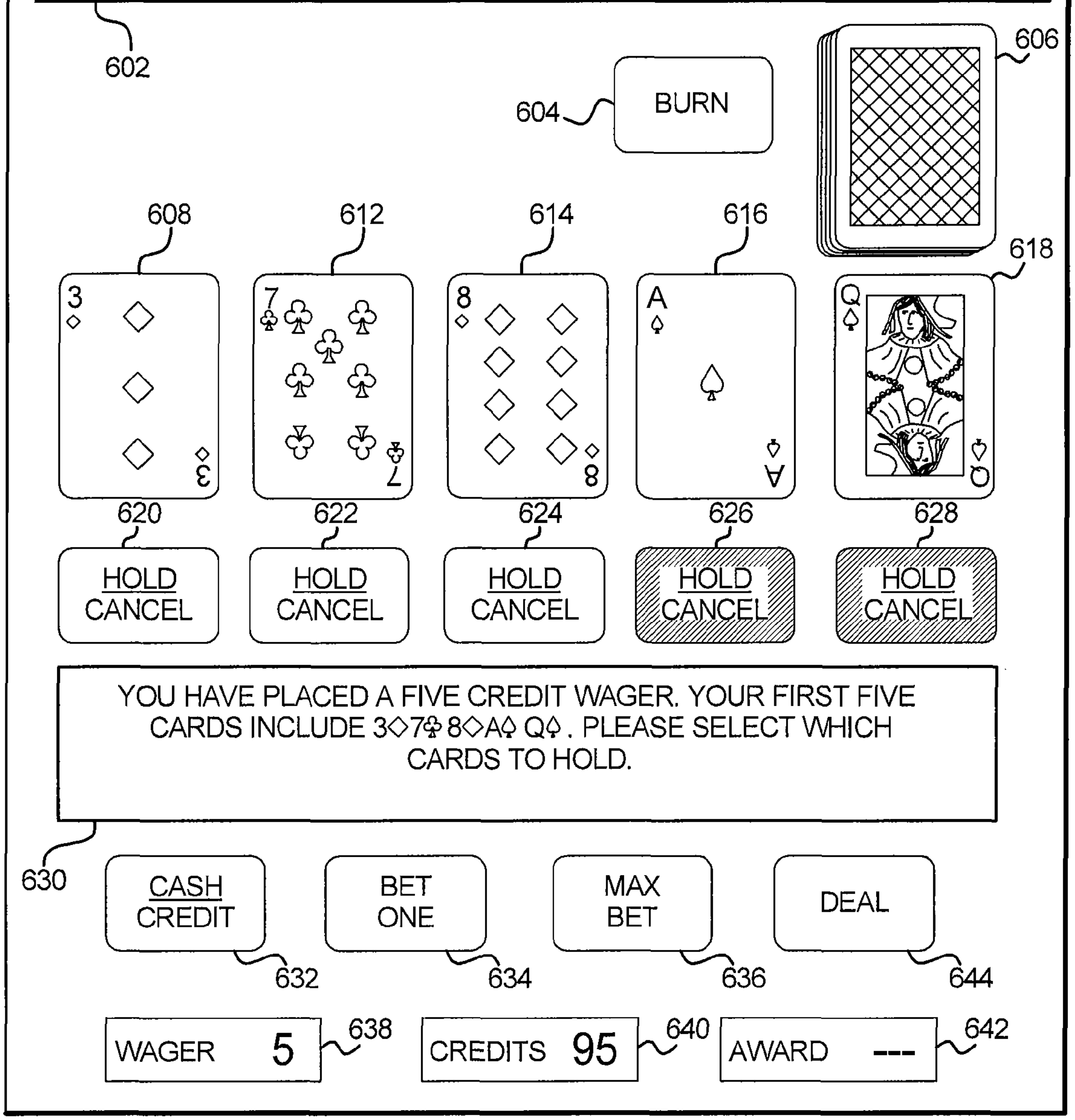

As shown in FIG. 6A, the gaming system 600 prompts the player to place a wager of up to five credits, as indicated by the message display 630. In this example play of the game, the player places the maximum five credit wager, as indicated by the activated max bet input 636 and the wager display 638. As shown in FIG. 6B, the gaming system causes five cards to be dealt to player positions 608, 612, 614, 616 and 618 to form the first player hand. The cards in the initial player hand include 3♦ 7♣ 8♦ A♠ Q♠, as also indicated in message display 630. As mentioned above, in this embodiment, the gaming system 600 does not cause the value of any of the draw cards to be revealed to the player until after the player has made the initial hold selections. Accordingly, the gaming system prompts the player to select which cards to hold, as indicated by message display 630. In this example play of the game, the player chooses to hold the A♠ in the fourth player cards position 616 and the Q♠ in the fifth player card position 618, as indicated by the activated hold inputs 626 and 628, respectively.

Figure 6C:
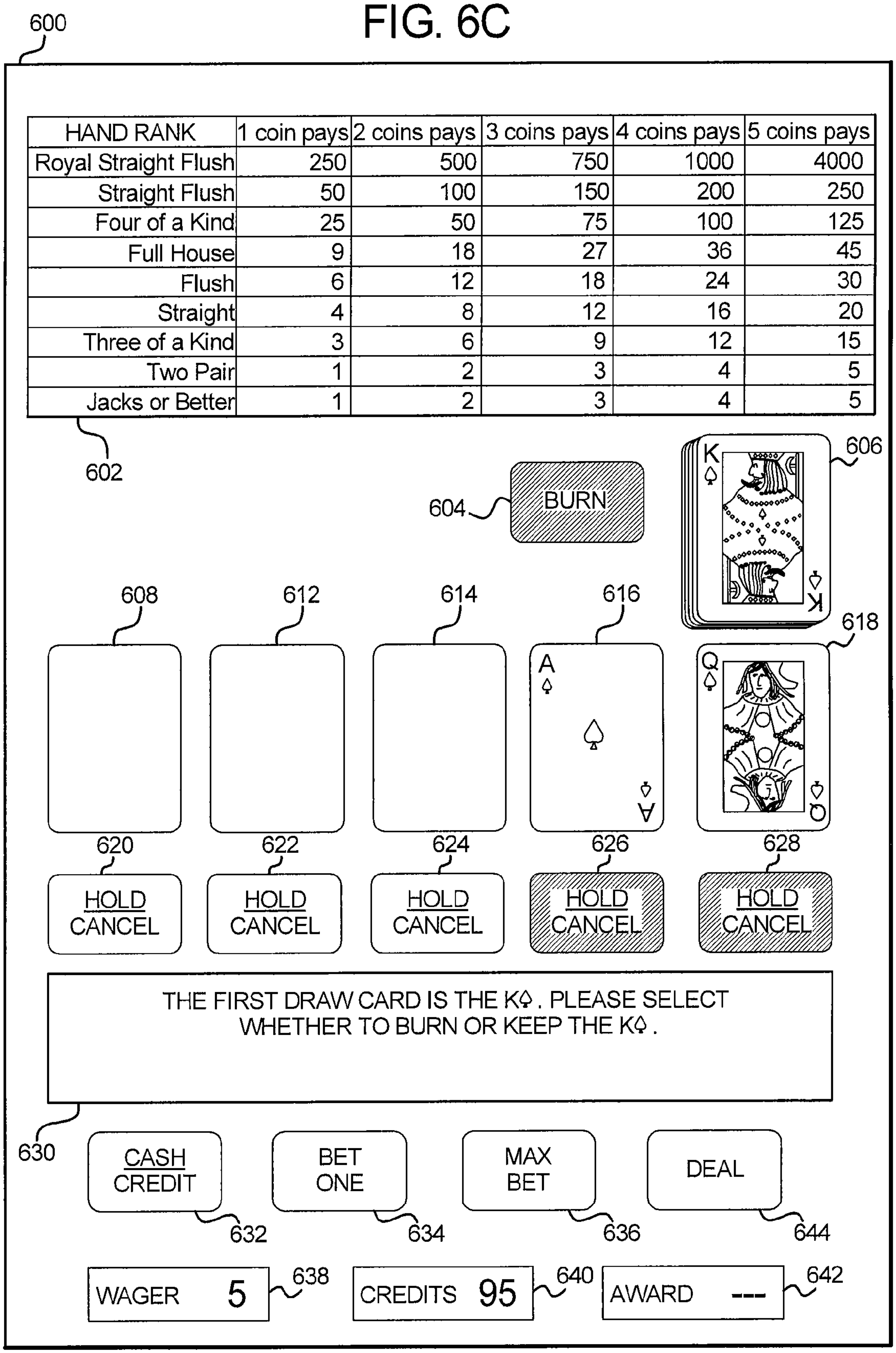

As shown in FIG. 6C, the gaming system causes the non-held player cards in card positions 608, 612 and 614 to be moved, cancelled or other wise discarded. The gaming system 600 also causes the first draw card 606 to be revealed, which is a K♠. As mentioned above, in this embodiment, the player can elect to discard or burn up to one of any of the draw cards. At this point in the play of the game, the player has the option of keeping the first draw card (i.e., the K♠) or burning the first draw card. In this example, the player chooses to keep the K♠, as indicated by the activated burn input 604 with the keep potion designated. Therefore, the player has three of five cards to form a Royal Straight Flush.

Figure 6D:
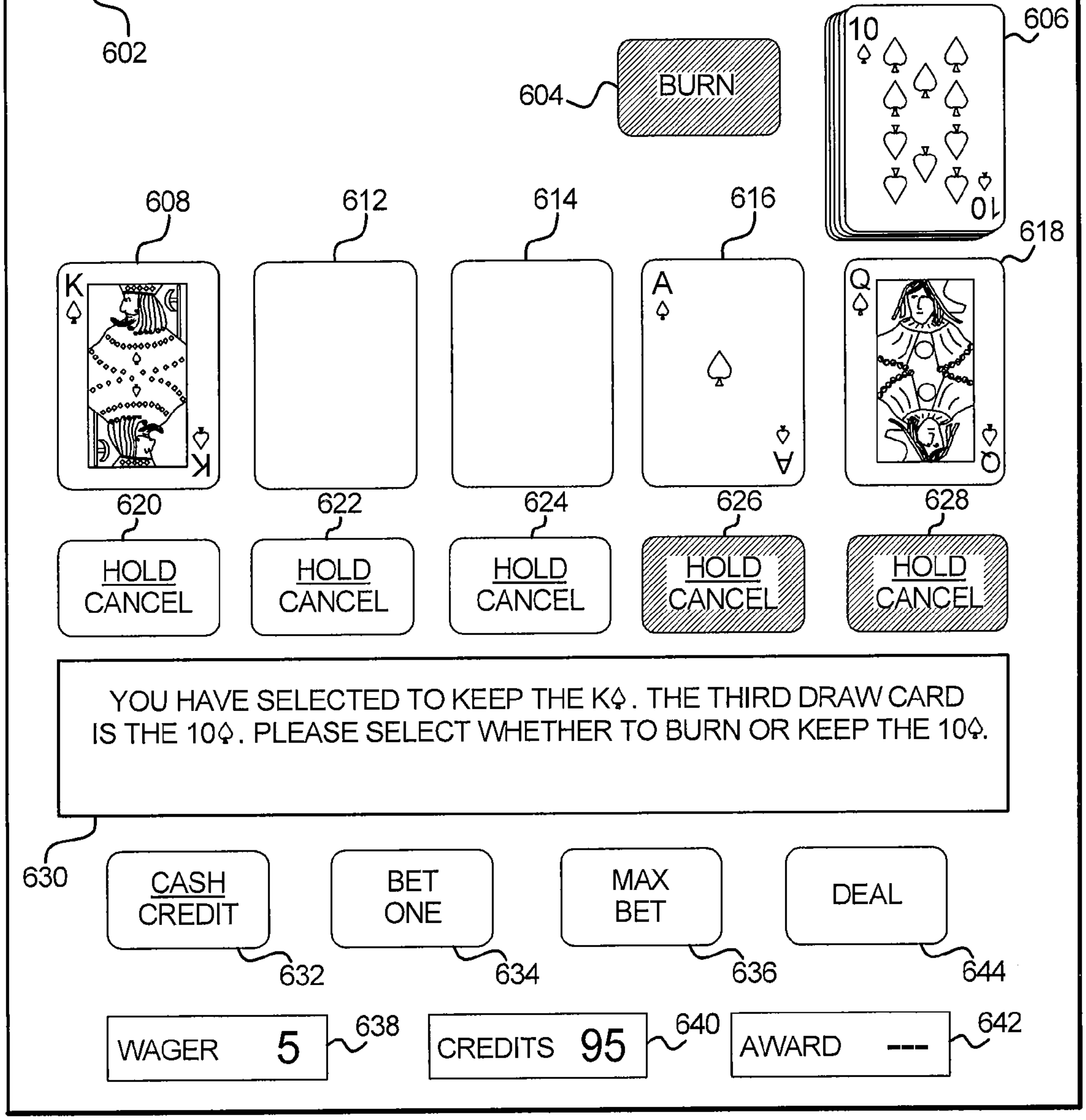

As shown in FIG. 6D, the gaming system 600 causes the K♠ to be moved into the first player card position 608. The gaming system 600 also reveals the second draw card, which is the 10♠. Because the player has not previously exercised the option to burn one of the draw cards, the gaming system 600 prompts the player to choose whether to burn or keep the 10♠, as indicated by message display. In this example, the player chooses to keep the 10♠, as indicated by the activated burn input 604 with the keep portion designated. Therefore, the player has four of five cards to form a Royal Straight Flush.

Figure 6E:
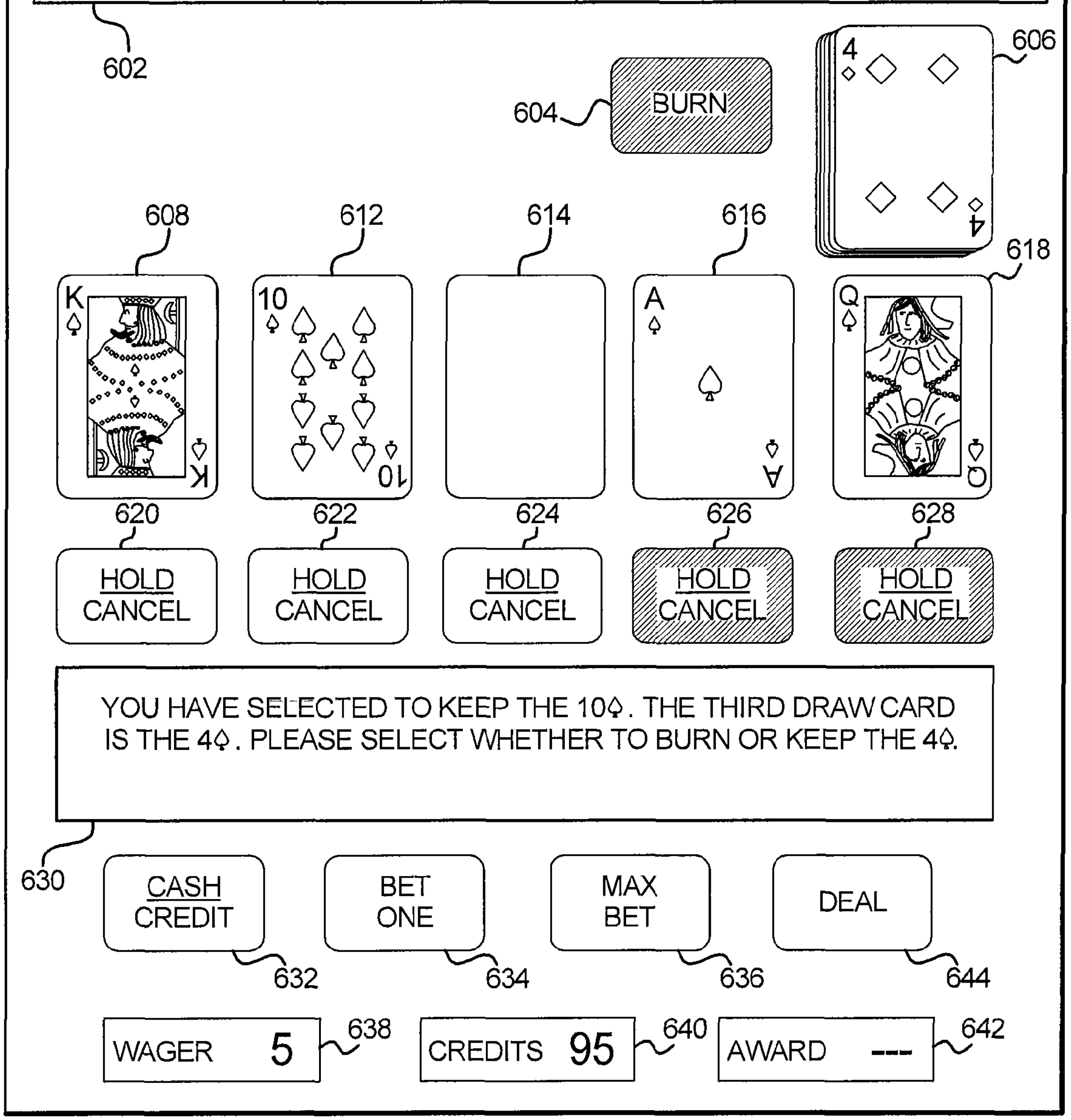
Figure 6F:
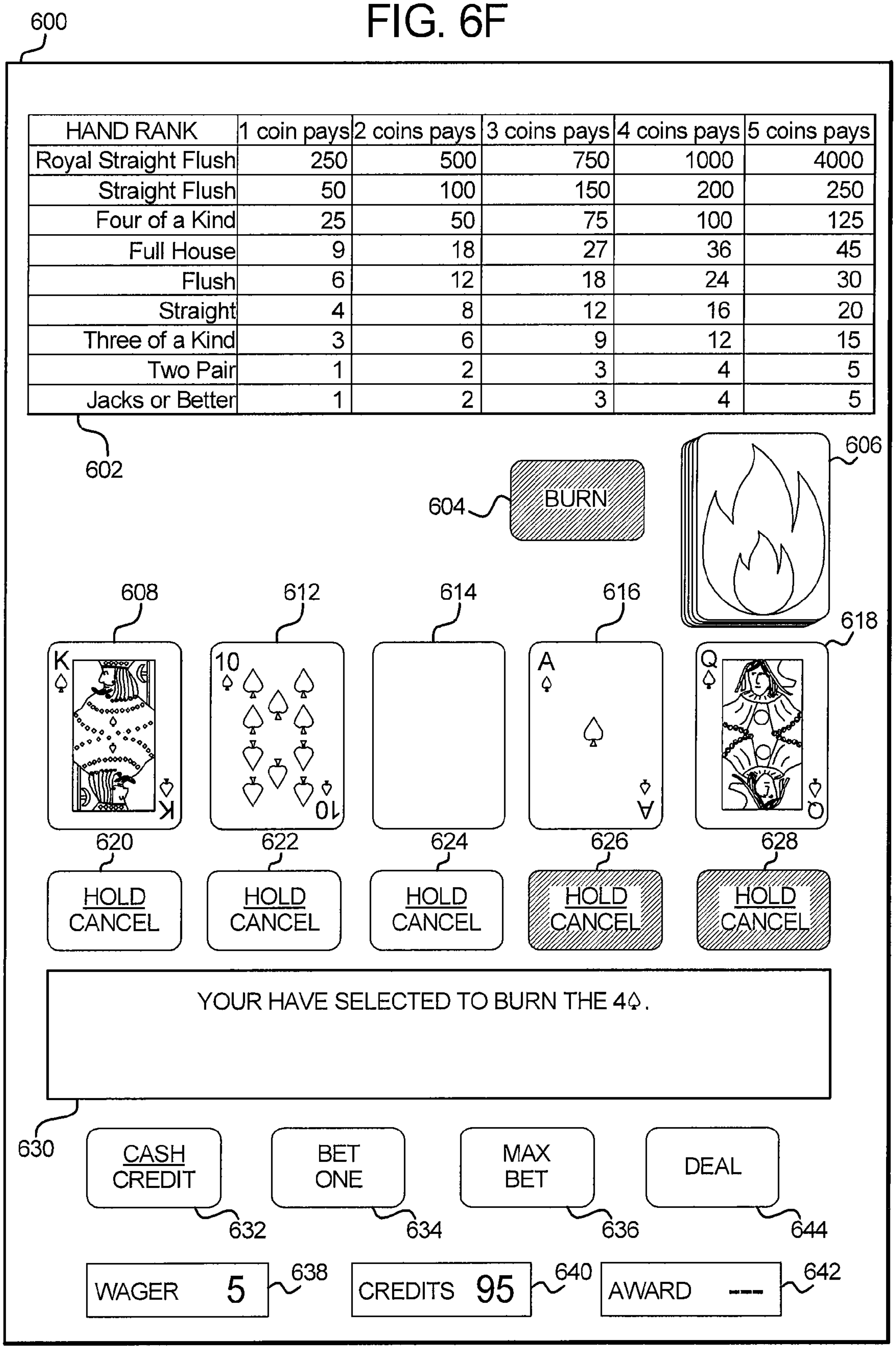

As shown in FIG. 6E, the gaming system 600 causes the 10♠ to be moved into the second player card position 612. The gaming system 600 then reveals the third draw card, which is the 4♦. Because the player has not previously exercised the option to burn one of the draw cards, the gaming system 600 prompts the player to choose whether to burn or keep the 10♠ as indicated by message display. As shown in FIG. 6F, because the player is trying to achieve a Royal Straight Flush, the player chooses to burn the 4♦, and as indicated by the activated burn input 604 with the burn portion designated and as indicated by the message display 630. Therefore, the player still has four of five cards to form a Royal Straight Flush. However, because the player has now exercised the player's single burn option, the final draw card will be automatically moved the third player card position 614.

Figure 6G:
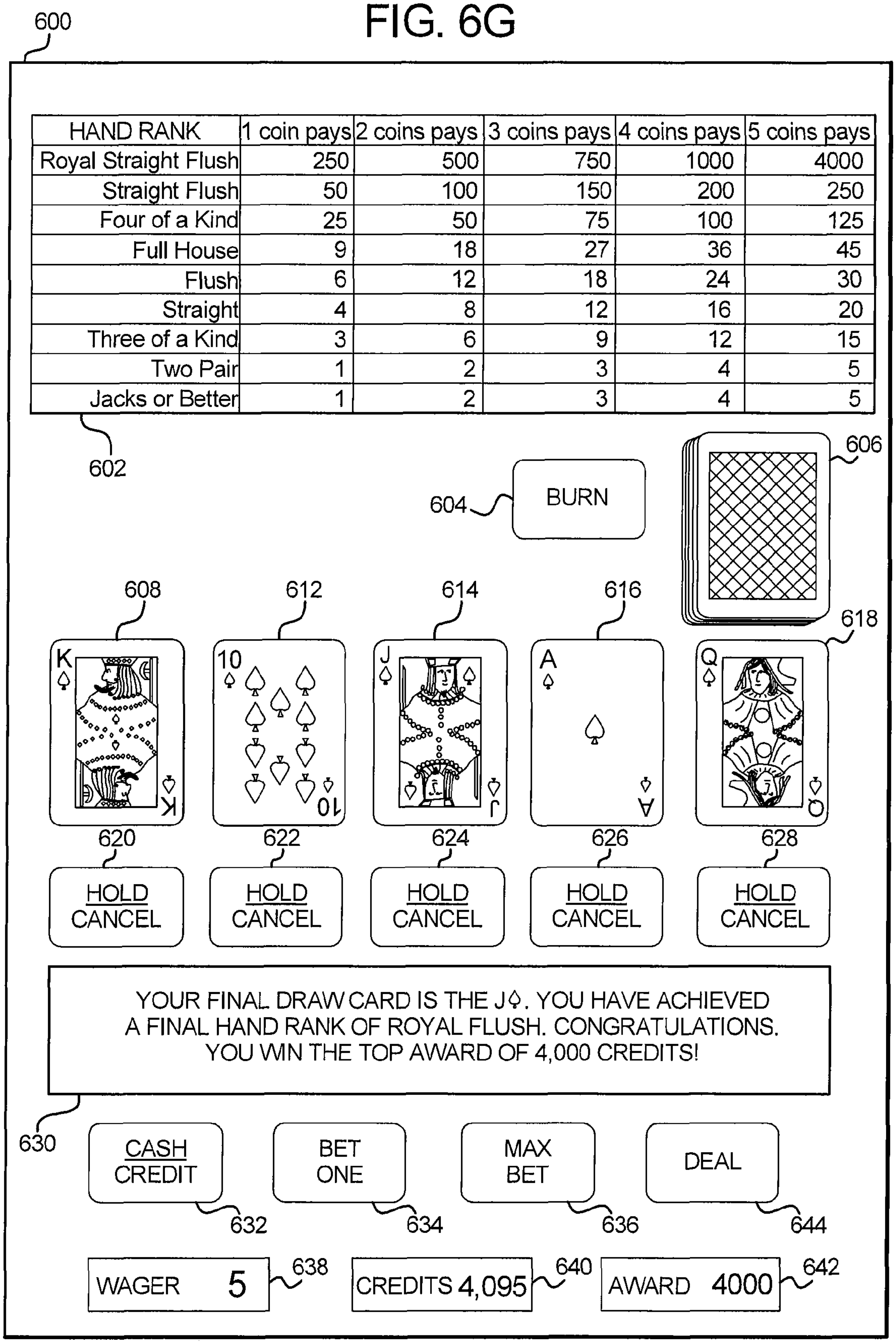

As shown in FIG. 6G, the gaming system 600 causes a draw card to be dealt to the third player card position 614. In this example, this draw card is the J♠, which completes the Royal Straight Flush, as also indicated in the message display. The gaming system 600 causes the top award of four thousand credits to be provided to the player, as indicated in the message display 630 and award display 642. The gaming system 600 also increases the total player credits from ninety-five to three thousand nine hundred and ninety-five, as indicated in the credits display 640. Therefore, in this embodiment, because the player is not required to exercise the burn option on the very first draw card, the player can hold this option in reserve and wait to exercise it until a poor draw card is revealed. In this example, if the player would have been required to exercise the burn option on the first draw card, the player would not have exercised the option and had a final hand of A♠K♠Q♠4♦ and 10♠ Accordingly, by being able to selectively exercise the burn option, players can potentially increase the number of winning hands.

In other embodiments, the gaming system provides a multiple hand version of the various five cards draw poker games, as discussed above. In these embodiments, the gaming system or gaming device causes a plurality of five card player hands to be dealt face-up to the player. In one of these embodiments, the gaming system causes a single first draw card to be revealed to the player. Based on the cards in each of the multiple player hands, the player can optionally discard the first draw card or keep the first draw card. The player then selects cards to replace in each of the three player hands. For each of the multiple player hands, if the first draw card was kept and at least one card in the player hand is selected to be replaced, the first draw will replace one of the cards in the respective player hands. Any remaining cards to be replaced in the different player hands are selected from the remaining cards in the virtual deck of cards. In one example, the draw cards are different for each of the cards replaced in the player hands (e.g., for each card to be replaced in the multiple player hands, different draw cards are selected and used in a sequential fashion). In another example, the same draw cards will be used in each of the player hands. In this example, the gaming system selects and designates up to five draw cards to use as replacement cards in the player hands. The first of the draw cards would replace one of the cards to be replaced in each of the applicable player hands (e.g., if one player hand has no cards to replace, this first draw card would not be used in that hand). This process repeats for each of the draw cards until all of the selected cards to be replaced in all of the player hands have been replaced. In one multiple hand embodiment, the draw card that may be burned is the same for all of the different player hands. In this embodiment, three separate virtual decks of cards are used, but the possible burn card is the same for all of the decks.

Although several of the examples in this disclosure focus on a Five Card Draw Video Poker game, it should be appreciated that the concepts described above may be applied to any gambling game that uses sequential revelation of game outcome elements. Said game outcome elements can include, but are not limited to cards, dice, dominos, Pai Gow tiles, or any other suitable outcome element. In certain embodiments, there is one turn and burn opportunity (i.e., an opportunity to retain or discard an outcome element). In other embodiments, there are more than one turn and burn opportunities. In certain embodiments, there is only one specific stage in the game where the player is able to exercise a turn and burn opportunity. In other embodiments, there are multiple stages in the game where the player is able to exercise a turn and burn opportunity. In certain embodiments, the turn and burn opportunity is for an outcome that affects the player. In some embodiments, the turn and burn opportunity is for an outcome that affects the dealer. In some embodiments, the turn and burn opportunity is for a common outcome that can affect the player and/or the dealer. In some embodiments, turn and burn decisions that affect the dealer or that affect common outcomes are controlled by applicable game rules. In certain embodiments, turn and burn decisions that affect the dealer or that affect common outcomes are controlled by a selected player. In one variation, in a multiplayer game, the player selection can be based on a number of mechanisms including, but not limited to, selecting the controlling player in a round-robin fashion, selecting the player who made the largest wager, or by any other suitable mechanism. In another variation, in a multiplayer game, the player selection is based on a vote of the players in the game.

Certain embodiments of the present disclosure can be applied to the game of Blackjack. In one variation, the player is given the opportunity to examine the first card on top of the deck prior to committing to a follow-up action such as hitting, doubling down or splitting. In this variation the player is able to view the first card in the deck without being committed to take another card. If the player does not like this card, the player can discard it, thereby making the next card on the deck the next available card. In one embodiment, the player has this capability for the first card in the initial player hand. In another embodiment, the player has this capability for the second card in the initial player hand. In another embodiment, the player has this capability after receiving the player's two initial cards, but before the player commits to a specific follow-up action (e.g., to hit, stand, double-down, split, etc.).

In another Blackjack embodiment, the player has the capability to keep or discard the first card in the deck after receiving the player's two initial cards and after the player has already committed to a follow-up action such as hitting, doubling down or splitting. In order for this feature to be activated, the player's follow-up action must result in the player needing to receive another card (e.g., if the player stands with an initial hand of twenty, there is no need to give the player an option to discard or keep the first card in the deck).

In another Blackjack embodiment, after the player has viewed the first card in the deck, the player has the following options: (a) standing (i.e., electing not to take the burn card); (b) standing and burning the first card in the deck; (c) hitting; (d) doubling down; (e) splitting cards; (f) burning the first card in the deck and then hitting; (g) burning the first card in the deck and then doubling down; and (h) burning the first card in the deck. In another Blackjack embodiment, after the player has viewed the first card in the deck, the player has the following options: (a) hitting; (b) doubling down; (c) splitting cards; (d) burning the first card in the deck and then hitting; (e) burning the first card in the deck and then doubling down; and (f) burning the first card in the deck. In this embodiment, the player must commit to taking the first card in the deck (i.e., not standing) but can choose between different kinds of actions. For example, if a player is dealt an initial Blackjack hand that includes 8-8 exercised a turn and burn option, and the first card in the deck is a Four or a Five, the player may choose to take a hit. If the first card in the deck is a Ten or an Ace, the player may choose to split the cards. If the first card in the deck is a Six or a Seven, the player may choose to burn the first card in the deck and then split the cards. In another embodiment, one of the player options after burning a card is to surrender. In another embodiment, the player must make a decision whether to exercise a turn and burn option prior to being able to view the up-card in the dealer hand.

In another Blackjack embodiment, the player has the ability to view and discard at any point after the player has already received the player's initial two cards and can still receive additional cards. In another embodiment, the player has this peek and burn capability any time that the player can receive a card, whether or not the player already has two initial cards. In another embodiment, the gaming system enables the player to optionally replace the dealer's up-card. In another embodiment, the gaming system provides the player with the ability to have the dealer's first additional card burned before the dealer receives it. In another embodiment, the gaming system enables the player to burn or discard any one of the dealer's additional cards before the dealer receives it. In another embodiment, the gaming system provides the player with the ability to burn or discard any one of the dealer's additional cards before the dealer receives it, including the dealer's initial up-card. In any of the embodiments described above where the player is able to burn one of the cards in the dealer hand or burn one of the dealer's draw cards, this advantage to the player can be financed by an additional player wager, through a reduced payout scheme or through any other suitable means. In one embodiment of a multiple player Blackjack game, the decision to burn or keep one or more draw cards is determined by player position at the gaming table. For example, the person sitting at third base at the Blackjack table may get to be the person to make the burn decision. In one embodiment, the decision to burn a card is made only with respect to the draw cards for the dealer hand. In this embodiment, the decision to keep or burn the first dealer hand draw card is based only on the value of the up-card in the initial dealer hand.

In another Blackjack embodiment, the game is a multi-hand version of Blackjack. In this embodiment, if a player plays a certain number of hands (e.g., three hands) and the player makes a certain sized qualifying wager, the player is given a number of turn and burn opportunities (e.g., one). Therefore, depending on the number of hands played and the size of the player's wager, the player may have one or more than one turn and burn opportunities. The number of turn and burn opportunities may be less than, equal to, or greater than the total number of hands played. In one embodiment, if the player has more than one turn and burn opportunity, the player may exercise multiple opportunities on a single player hand or spread them throughout the different player hands.

Certain embodiments of the present disclosure can be applied to the card game of Three Card Poker. In one embodiment, the gaming system provides the player with an opportunity to examine or view the first card on top of the deck prior to receiving a card. If the player does not like this card, the player can have it discarded, thereby making the next card on the deck the next available card from the deck. In one embodiment, the player has this option for the player's very first card. In another embodiment, the player has this option for the player's second card. In another embodiment, the player has this option for the player's third card. In one embodiment, the gaming system provides the player with the peek and burn option for any of the player's three cards. In another embodiment, the player's peek and burn capability can be exercised prior to the player deciding on whether to Play or Fold during the game. In another embodiment the player's peek and burn capability can be exercised only after the player has committed to place a Play wager. In another embodiment of Three Card Poker where the dealer reveals a dealer up card, the player has the ability to have this up-card replaced.

Certain embodiments of the present disclosure can be applied to the game of Three Card Draw Poker, as described in U.S. patent application Ser. No. 11/937,310. In certain embodiments, the player has one or more of the capabilities described for a standard game of Three Card Poker. In another embodiment, the gaming system enables the player to peek and burn the player's first draw card. In another embodiment, the player has the ability to peek and burn any one of the player's second draw cards. In one embodiment, the player's peek and burn capability may be used prior to the player deciding which initial player cards to hold. In another embodiment, the player's peek and burn capability may only be used after the player has committed to holding and replacing specific initial cards. In another embodiment, the player has the ability to burn the first of the dealer's draw cards. In another embodiment, the player has the ability to burn any one of the dealer's draw cards. In one embodiment, the player's ability to burn one of the dealer's cards can be exercised only before the dealer has committed to holding and replacing specific dealer cards. In another embodiment, the player is able burn a dealer draw card after the dealer has committed to holding and replacing specific dealer cards.

Certain embodiments of the present disclosure can be applied to variations of Texas Hold'em where the player plays against the casino. In certain embodiments, the player is able to peek and burn the first player hole card. In certain other embodiments, the player is able to peek and burn the second player hole card. In certain other embodiments, the player is able to peek and burn either the first or second player hole card. In certain other embodiments, the player is able to peek and burn one or more community cards. In certain other embodiments, the player is able to peek and burn the dealer's first hole card. In certain other embodiments, the player is able to peek and burn the dealer's second hole card. In certain other embodiments, the player is able to peek and burn either of the dealer's hole cards. In one embodiment of a multiple player Texas Hold'em game, the decision to burn or keep one or more of the community cards is determined by player position at the gaming table. For example, the dealer, the person to the right of the dealer or the person to the left of the dealer may be the person to determine whether one or more of the community cards are burned.

Certain embodiments of the present disclosure can be applied to variations of Baccarat, such as American Baccarat, Conventional American Baccarat is played at a casino table having two identical ends and a middle area for the "croupier" or "caller." Usually, up to fourteen players can sit at the table. Each player position has three betting areas, which correspond to the "banker," "player," and "tie" bets. Regardless of the number of players at the table, only two hands are dealt (i.e., the banker hand and the player hand). In one version, the Baccarat table game is played with six or eight decks of standard playing cards (each including fifty-two playing cards) and the dealing rotates player-by-player by passing the shoe counterclockwise around the table, enabling each player to represent the "banker" or the banker hand. It should be appreciated that even though the player with the shoe represents the banker hand, that player is not obligated to bet on the banker hand, does not pay out wins to other players, and does not otherwise function as the banker and the gaming establishment or casino remains the true banker. That is, the player's role as the banker is ceremonial. In this version, the croupier instructs the player representing the banker regarding if and when to deal playing cards and announces the winning hand. In one version of Baccarat, playing card values are as follows: (i) tens and face cards (i.e., jacks, queens, and kings) are worth zero; (ii) aces are worth one; and (iii) two through nine are worth their respective values. Playing card suits generally have no function in calculating the hand values in Baccarat. The hands are totaled by summing the values of the respective cards. If the total of the hand exceeds ten, the ten's digit is ignored and only the one's digit is relevant. For example, if the first two playing cards dealt are Jack and four, the hand value or count is four. If the first two playing cards dealt are an eight and six, totaling fourteen, the ten's digit is ignored and the count is again four. The highest total any Baccarat hand can have is nine. A two playing card total of nine is called a "natural" and cannot lose (because at worst a tie occurs with the dealer). An eight is the second best hand and is also called a natural. If both the banker hand and player hand are dealt hands with the same total, a standoff or tie occurs and neither banker hand nor player hand wins. After the final playing cards are dealt, the scores of the player hand and banker hand are compared. The winning hand is the hand that holds two or three playing cards totaling closest to nine. If a tie occurs, in one version, bets on the banker hand or player hand are returned to the players.

In one embodiment of the present disclosure applied to a Baccarat game, the gaming system or live dealer deals an initial two-card player hand and a two card dealer hand. When both cards in each of the player hand and dealer hand are totaled, it can be determined whether or not the player and dealer (or banker) may draw a single card. In one embodiment, if the table of play or Tableau dictates that a player may draw a single card, the gaming system or dealer provides the player with an option to peek and burn the draw card. If the player views the draw and it would result in a low ranking Baccarat hand (e.g., zero, one, two or three value hands), the player can choose to burn the draw card and use the next card in the deck. In another embodiment, if the table of play dictates that the dealer can draw a single card, the player has the option to view and burn the would be dealer's draw card. In this embodiment, if the dealer would have a potentially high ranking Baccarat hand due to the addition of a draw card, the player can burn the dealer's draw card such the dealer hand receives the next draw card in the deck. In one embodiment, the higher ranking hand between the player hand and the dealer hand is able to choose whether or not to burn a draw card.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:

(a) causing at least one processor to execute a plurality of instructions stored in at least one memory device to operate with at least one input device to receive a wager from a player for a play of a game;

(b) after receiving the wager, causing the at least one processor to execute the plurality of instructions stored in the at least one memory device to determine a plurality of playing cards for an initial player hand for said play of the game from a virtual deck of playing cards;

(c) prior to displaying the plurality of cards of the initial player hand face-up, causing the at least one processor to execute the plurality of instructions stored in the at least one memory device to operate with the at least one input device to enable the player to place a first supplemental wager;

(d) causing the at least one processor to execute the plurality of instructions stored in the at least one memory device to operate with at least one display device to display the plurality of cards of the initial player hand face-up;

(e) if the player places the first supplemental wager:

(A) causing the at least one processor to execute the plurality of instructions stored in the at least one memory device to operate with the at least one display device to display a first draw card face-up from the virtual deck of playing cards;

(B) before displaying any further draw cards face-up from the virtual deck of playing cards:

(1) causing the at least one processor to execute the plurality of instructions stored in the at least one memory device to operate with the at least one input device to enable the player to reserve or discard the first draw card, and (2) causing the at least one processor to execute the plurality of instructions stored in the at least one memory device to determine if the first draw card has been reserved or discarded;

(C) causing the at least one processor to execute the plurality of instructions stored in the at least one memory device to operate with the at least one input device to enable the player to designate a quantity of the playing cards of the initial player hand to replace;

(D) if the quantity of designated playing cards to replace is at least one and the first draw card was reserved:

(1) causing the at least one processor to execute the plurality of instructions stored in the at least one memory device to form a second player hand by replacing one of the designated playing cards with the first draw card, and (2) causing the at least one processor to execute the plurality of instructions stored in the at least one memory device to replace any other designated playing cards with draw cards other than the first draw card from the virtual deck of playing cards; and (E) if the quantity of designated playing cards to replace is at least one and the first draw card was discarded, causing the at least one processor to execute the plurality of instructions stored in the at least one memory device to form the second player hand by replacing the designated playing cards with draw cards other than the first draw card from the virtual deck of playing cards;

(f) if the player does not place the first supplemental wager:

(A) causing the at least one processor to execute the plurality of instructions stored in the at least one memory device to operate with the at least one input device to enable the player to designate a quantity of the playing cards of the initial player hand to replace; and (B) causing the at least one processor to execute the plurality of instructions stored in the at least one memory device to form the second player hand by replacing the designated playing cards with draw cards from the virtual deck of playing cards;

(g) causing the at least one processor to execute the plurality of instructions stored in the at least one memory device to determine a rank of the second player hand;

(h) causing the at least one processor to execute the plurality of instructions stored in the at least one memory device to determine any awards to be provided to the player based on the rank of the second player hand and according to a paytable; and (i) causing the at least one processor to execute the plurality of instructions stored in the at least one memory device to cause any determined awards to be provided to the player.

2. The method of claim 1, wherein the initial player hand includes five playing cards.

3. The method of claim 1, which includes providing (e)(A) after causing the at least one processor to execute the plurality of instructions stored in the at least one memory device to operate with the at least one input device to determine if the player has designated playing cards to replace in the initial player hand.

4. The method of claim 1, which includes, after providing (e)(A), causing the at least one processor to execute the plurality of instructions stored in the at least one memory device to operate with the at least one input device to determine if the player has designated playing cards to replace in the initial player hand.

5. The method of claim 1, which includes causing the at least one processor to execute the plurality of instructions stored in the at least one memory device to operate with the at least one input device to enable the player to make an optional payment, and causing the at least one processor to execute the plurality of instructions stored in the at least one memory device to operate with the at least one display device to, if the optional payment is received, display a second draw card face-up from the virtual deck of playing cards.

6. The method of claim 5, which includes after (e)(B)(2), causing the at least one processor to execute the plurality of instructions stored in the at least one memory device to operate with the at least one display device to display the second draw card face-up from the virtual deck of playing cards.

7. The method of claim 6, which includes causing the at least one processor to execute the plurality of instructions stored in the at least one memory device to operate with the at least one input device to enable the player to make a second optional payment, and causing the at least one processor to execute the plurality of instructions stored in the at least one memory device to operate with the at least one input device to, if the second optional payment is received, enable the player to reserve or discard the second draw card.

8. The method of claim 1, which is provided through a data network.

9. The method of claim 8, wherein the data network is an internet.

10. The method of claim 8, wherein the data network is a wireless network.

11. The method of claim 1, which includes causing the at least one processor to execute the plurality of instructions stored in the at least one memory device to randomly determine a quantity of draw cards to display face-up from the virtual deck of playing cards.

12. The method of claim 1, which includes providing (e)(B)(1) after receiving a second supplemental wager from the player.

13. The method of claim 1, which includes providing (e)(C) after providing (e)(A) and (e)(B)(1).

14. The method of claim 1, which includes providing) (e)(A) and (e)(B)(1) after providing (e)(C).

15. A method of operating a gaming system, said method comprising:

(a) causing at least one processor to execute a plurality of instructions stored in at least one memory device to operate with at least one input device to receive a wager from a player for a play of a game;

(b) after receiving the wager, causing the at least one processor to execute the plurality of instructions stored in the at least one memory device to determine a plurality of playing cards for an initial player hand from a virtual deck of playing cards;

(c) prior to displaying the plurality of cards of the initial player hand face-up, causing the at least one processor to execute the plurality of instructions stored in the at least one memory device to operate with the at least one input device to enable the player to place a first supplemental wager;

(d) causing the at least one processor to execute the plurality of instructions stored in the at least one memory device to operate with at least one display device to display the plurality of cards of the initial player hand face-up;

(e) causing the at least one processor to execute the plurality of instructions stored in the at least one memory device to operate with the at least one input device to enable the player to designate playing cards to replace in the initial player hand;

(f) causing the at least one processor to execute the plurality of instructions stored in the at least one memory device to determine a quantity of designated playing cards to be replaced;

(g) if the player places the supplemental wager:

(A) causing the at least one processor to execute the plurality of instructions stored in the at least one memory device to operate with the at least one display device to display at least one draw card face-up from the virtual deck of playing cards, (B) causing the at least one processor to execute the plurality of instructions stored in the at least one memory device to operate with the at least one input device to enable the player to keep or discard the at least one draw card, (C) if the at least one draw card has been kept, causing the at least one processor to execute the plurality of instructions stored in the at least one memory device to operate with the at least one display device to display said at least one draw card replacing one of the designated playing cards to be replaced in the initial player hand before displaying any further draw cards face-up from the virtual deck of playing cards, and (D) causing the at least one processor to execute the plurality of instructions stored in the at least one memory device to operate with the at least one display device to display other draw cards from the virtual deck of playing cards replacing any remaining designated playing cards to be replaced to form a final player hand;

(h) if the player does not place the supplemental wager, causing the at least one processor to execute the plurality of instructions stored in the at least one memory device to operate with the at least one display device to display draw cards from the virtual deck of playing cards replacing each of said designated playing cards to be replaced to form a final player hand;

(i) causing the at least one processor to execute the plurality of instructions stored in the at least one memory device to determine a rank of the final player hand;

(j) causing the at least one processor to execute the plurality of instructions stored in the at least one memory device to determine any awards to be provided to the player based on the rank of the final player hand and according to a paytable; and (k) causing the at least one processor to execute the plurality of instructions stored in the at least one memory device to cause any determined awards to be provided to the player.

16. The method of claim 15, which includes causing the at least one processor to execute the plurality of instructions stored in the at least one memory device to determine a quantity of draw cards that can be discarded, the determined quantity being one.

17. The method of claim 15, which includes causing the at least one processor to execute the plurality of instructions stored in the at least one memory device to determine a quantity of draw cards that can be discarded, the determined quantity being two.

18. The method of claim 15, which includes after providing (e), causing the at least one processor to execute the plurality of instructions stored in the at least one memory device to operate with the at least one display device to display at least one of the draw cards face-up from the virtual deck of playing cards.

19. The method of claim 15, which includes providing (e) after providing (g)(A).

20. The method of claim 15, which is provided through a data network.

21. The method of claim 20, wherein the data network is, an internet.

22. The method of claim 20, wherein the data network is a wireless network.

23. A gaming system comprising:

at least one input device;

at least one processor;

at least one display device; and at least one memory device storing a plurality of instructions which when executed by the at least one processor, cause the at least one processor to operate with the at least one display device and the at least one input device to, for a play of a poker game:

(a) enable a player to place a primary wager for the play of the poker game;

(b) upon receiving a signal indicating that the player has placed the primary wager, determine a plurality of playing cards for an initial player hand from a virtual deck of playing cards;

(c) prior to displaying the plurality of cards of the initial player hand face-up, enable the player to place a supplemental wager;

(d) display the plurality of cards of the initial player hand face-up;

(e) upon receiving a signal that the player has placed the supplemental wager:

(i) display a first draw card face-up from the virtual deck of playing cards;

(ii) before displaying any further draw card face-up from the virtual deck of playing cards, enable the player to keep or discard said first draw card;

(iii) upon receiving signals that the player has selected to keep the first draw card and has selected to replace at least one of the playing cards in the initial player hand:

(A) cause a replacement of one of the playing cards in the initial player hand with the first draw card, and (B) cause a replacement of any other playing cards to be replaced in the initial player hand with other draw cards from the virtual deck to form a final player hand, said other draw cards excluding the first draw card; and (iv) upon receiving signals that the player has selected to discard the first draw card and has selected to replace at least one of the playing cards in the initial player hand, cause a replacement of the selected playing cards in the initial player hand with draw cards from the virtual deck other than the first draw card to form the final player hand;

(f) if the player does not place the first supplemental wager and the player has selected to replace at least one of the playing cards in the initial player hand, cause a replacement of the selected playing cards in the initial player hand with draw cards from the virtual deck; and (g) upon receiving a signal that any selected playing cards in the initial player hand have been replaced:

(i) determine any awards to be provided to the player based on a rank of the final player hand and according to a paytable; and (ii) cause any determined awards to be provided to the player.

24. A method of operating a gaming system, said method comprising:

(a) causing at least one processor to execute a plurality of instructions stored in at least one memory device to operate with at least one input device to receive a wager from a player for a play of a game;

(b) causing the at least one processor to execute the plurality of instructions stored in the at least one memory device to determine a plurality of game elements for an initial player outcome;

(c) prior to displaying the plurality of game elements for the initial player outcome, causing the at least one processor to execute the plurality of instructions stored in the at least one memory device to operate with the at least one input device to enable the player to place a supplemental wager;

(d) causing the at least one processor to execute the plurality of instructions stored in the at least one memory device to operate with at least one display device to display the plurality of game elements for the initial player outcome to the player;

(e) if the player places the first supplemental wager:

(A) causing the at least one processor to execute the plurality of instructions stored in the at least one memory device to operate with the at least one display device to display a first replacement element from a set of replacement elements to the player;

(B) before displaying any further replacement elements from the set to the player, causing the at least one processor to execute the plurality of instructions stored in the at least one memory device to operate with the at least one input device to enable the player to keep or discard the first replacement element;

(C) causing the at least one processor to execute the plurality of instructions stored in the at least one memory device to operate with the at least one input device to enable the player to designate game elements from the initial player outcome to be replaced;

(D) if a quantity of designated game elements to be replaced is at least one and the first replacement element was kept, causing the at least one processor to execute the plurality of instructions stored in the at least one memory device to determine the final player outcome by:

(1) causing the at least one processor to execute the plurality of instructions stored in the at least one memory device to replace one of the designated game elements with the first replacement element, and (2) causing the at least one processor to execute the plurality of instructions stored in the at least one memory device to replace any other designated game elements with replacement elements from the set other than the first replacement element; and (E) if the quantity of designated game elements to be replaced is at least one and the first replacement element was discarded, causing the at least one processor to execute the plurality of instructions stored in the at least one memory device to determine the final player outcome by replacing the designated game elements with replacement elements from the set other than the first replacement element;

(f) if the player does not place the first supplemental wager:

(A) causing the at least one processor to execute the plurality of instructions stored in the at least one memory device to operate with the at least one input device to enable the player to designate a quantity of game elements from the initial player outcome to be replaced; and (B) if the quantity of designated game elements is at least one, causing the at least one processor to execute the plurality of instructions stored in the at least one memory device to determine the final player outcome by replacing the designated game elements with replacement elements from the set;

(g) causing the at least one processor to execute the plurality of instructions stored in the at least one memory device to determine any awards to be provided to the player based on the final player outcome; and (h) causing the at least one processor to execute the plurality of instructions stored in the at least one memory device to cause any determined awards to be provided to the player.

25. The method of claim 24, wherein the game is selected from the group consisting of a card game, a draw poker game, a dice game, a dominos game, a Pai Gow Poker game, a Blackjack game, and a Baccarat game.

* * * * *

UNITED STATES PATENT AND TRADEMARK OFFICE

CERTIFICATE OF CORRECTION

PATENT NO. : 7,993,191 B2
APPLICATION NO. : 12/045431
DATED : August 9, 2011
INVENTOR(S) : Anthony M. Evans et al.

It is certified that error appears in the above-identified patent and that said Letters Patent is hereby corrected as shown below:

IN THE CLAIMS:

In Claim 14, column 31, line 49, replace "providing)" with --providing--.

In Claim 21, column 33, line 14, replace "is," with --is--.

Signed and Sealed this
Twenty-seventh Day of September, 2011

David J. Kappos
*Director of the United States Patent and Trademark Office*